US008781959B2

(12) United States Patent
Lawson et al.

(10) Patent No.: US 8,781,959 B2
(45) Date of Patent: Jul. 15, 2014

(54) SYSTEMS AND METHODS FOR GENERATING PAYMENT DUE NOTIFICATIONS

(75) Inventors: Mary Elizabeth Lawson, Dublin, OH (US); Cheryl L. Ward, Hilliard, OH (US); Hans Daniel Dreyer, Gahanna, OH (US)

(73) Assignee: Checkfree Corporation, Dublin, OH (US)

( * ) Notice: Subject to any disclaimer, the term of this patent is extended or adjusted under 35 U.S.C. 154(b) by 0 days.

(21) Appl. No.: 13/033,040

(22) Filed: Feb. 23, 2011

(65) Prior Publication Data

US 2011/0145116 A1 Jun. 16, 2011

Related U.S. Application Data

(63) Continuation of application No. 10/608,562, filed on Jun. 30, 2003, now Pat. No. 7,930,248.

(51) Int. Cl.
*G06Q 40/00* (2012.01)

(52) U.S. Cl.
USPC .................................. 705/40; 705/34; 705/39

(58) Field of Classification Search
USPC ..................... 705/34, 35, 40, 42, 70
See application file for complete search history.

(56) References Cited

U.S. PATENT DOCUMENTS

| 4,823,264 | A | 4/1989 | Deming |
| 5,025,373 | A | 6/1991 | Keyser, Jr. et al. |
| 5,220,501 | A | 6/1993 | Lawlor et al. |
| 5,283,829 | A | 2/1994 | Anderson |
| 5,326,959 | A | 7/1994 | Perazza |
| 5,336,870 | A | 8/1994 | Hughes et al. |
| 5,383,113 | A | 1/1995 | Kight et al. |
| 5,420,405 | A | 5/1995 | Chasek |
| 5,465,206 | A | 11/1995 | Hilt et al. |
| 5,483,445 | A | 1/1996 | Pickering |
| 5,504,677 | A | 4/1996 | Pollin |
| 5,652,786 | A * | 7/1997 | Rogers ...................... 379/91.01 |
| 5,677,955 | A | 10/1997 | Doggett et al. |
| 5,684,965 | A * | 11/1997 | Pickering ........................ 705/34 |
| 5,699,528 | A | 12/1997 | Hogan |
| 5,710,889 | A | 1/1998 | Clark et al. |
| 5,727,249 | A | 3/1998 | Pollin |

(Continued)

OTHER PUBLICATIONS

White et al., "How Computers Work", Que, Sep. 1999.*

(Continued)

*Primary Examiner* — Steven Kim

(74) *Attorney, Agent, or Firm* — Sutherland Asbill & Brennan LLP

(57) ABSTRACT

Systems and methods for generating payment due notifications are provided. A payor and a payee of the payor may be identified by a payment service provider system. At least one notification control parameter associated with communicating payment due notifications to the payor may be identified. Based at least in part upon evaluating a payment history associated with one or more payments made to the payee on behalf of the payor, a payment frequency pattern may be determined. Based at least in part on a portion of the payment history and the determined payment frequency pattern, a next expected payment date may be calculated. In accordance with the at least one notification control parameter, a payment due notification including an identity of the payee and the next expected payment date may be generated. The payment due notification may be transmitted to the payor.

22 Claims, 17 Drawing Sheets

(56) References Cited

U.S. PATENT DOCUMENTS

| | | | |
|---|---|---|---|
| 5,794,221 A | | 8/1998 | Egendorf |
| 5,870,724 A | * | 2/1999 | Lawlor et al. ............ 705/42 |
| 5,873,072 A | | 2/1999 | Kight et al. |
| 5,884,288 A | | 3/1999 | Chang et al. |
| 5,920,847 A | | 7/1999 | Kolling et al. |
| 5,920,848 A | | 7/1999 | Schutzer et al. |
| 5,966,698 A | | 10/1999 | Pollin |
| 5,974,146 A | | 10/1999 | Randle et al. |
| 5,978,780 A | | 11/1999 | Watson |
| 6,029,150 A | | 2/2000 | Kravitz |
| 6,032,133 A | | 2/2000 | Hilt et al. |
| 6,070,150 A | | 5/2000 | Remington et al. |
| 6,073,104 A | * | 6/2000 | Field ............................ 705/2 |
| 6,098,053 A | | 8/2000 | Slater |
| 6,128,603 A | | 10/2000 | Dent et al. |
| 6,188,994 B1 | | 2/2001 | Egendorf |
| 6,289,322 B1 | | 9/2001 | Kitchen |
| 6,292,789 B1 | | 9/2001 | Schutzer et al. |
| 6,311,170 B1 | | 10/2001 | Embrey |
| 6,317,745 B1 | | 11/2001 | Thomas et al. |
| 6,505,249 B1 | | 1/2003 | Rehkopf |
| 6,516,996 B1 | | 2/2003 | Hippelainen et al. |
| 6,658,393 B1 | | 12/2003 | Basch et al. |
| 6,816,878 B1 | * | 11/2004 | Zimmers et al. ............ 709/200 |
| 6,934,691 B1 | * | 8/2005 | Simpson et al. ............ 705/34 |
| 6,999,943 B1 | | 2/2006 | Johnson et al. |
| 7,120,602 B2 | | 10/2006 | Kitchen |
| 7,653,591 B1 | | 1/2010 | Dabney et al. |
| 7,660,766 B1 | | 2/2010 | Lawson |
| 7,702,585 B2 | | 4/2010 | Lyda et al. |
| 7,930,248 B1 | | 4/2011 | Lawson |
| 2001/0037295 A1 | | 11/2001 | Olsen |
| 2002/0002535 A1 | * | 1/2002 | Kitchen et al. ............ 705/40 |
| 2002/0019808 A1 | | 2/2002 | Sharma et al. |
| 2002/0023055 A1 | | 2/2002 | Antognini et al. |
| 2002/0042773 A1 | | 4/2002 | Fugitte et al. |
| 2002/0111916 A1 | | 8/2002 | Coronna et al. |
| 2002/0116331 A1 | | 8/2002 | Cataline et al. |
| 2002/0133368 A1 | | 9/2002 | Strutt et al. |
| 2003/0055783 A1 | | 3/2003 | Cataline et al. |
| 2003/0225642 A1 | | 12/2003 | Baker et al. |
| 2003/0225690 A1 | | 12/2003 | Eaton et al. |
| 2004/0010465 A1 | | 1/2004 | Michalski et al. |
| 2004/0034595 A1 | | 2/2004 | Kugeman et al. |
| 2004/0064386 A1 | | 4/2004 | Goguen et al. |
| 2004/0078327 A1 | * | 4/2004 | Frazier et al. ............ 705/40 |
| 2004/0148234 A1 | | 7/2004 | Gonen-Friedman et al. |
| 2004/0215560 A1 | | 10/2004 | Amalraj et al. |

OTHER PUBLICATIONS

Lapin, "Statistics Meaning and Method", second edition, Harcourt Brace Jovanovich, Inc., 1980.*

Disclosure Under 37 C.F.R. 1.56.

Non-final Office Action dated Jun. 13, 2008 for related U.S. Appl. No. 10/608,415, filed Jun. 30, 2003.

Non-final Office Action dated Jan. 5, 2009 for related U.S. Appl. No. 10/608,415, filed Jun. 30, 2003.

Notice of Allowance mailed Jun. 29, 2009 for related U.S. Appl. No. 10/608,415, filed Jun. 30, 2003.

Non-Final Office Action for U.S. Appl. No. 10/608,415 mailed Sep. 7, 2007.

Non-Final Office Action for U.S. Appl. No. 10/608,562 mailed Apr. 4, 2008.

Final Office Action for U.S. Appl. No. 10/608,562 mailed Jan. 29, 2009.

Non-Final Office Action for U.S. Appl. No. 10/608,562 mailed Jul. 7, 2009.

Final Office Action for U.S. Appl. No. 10/608,562 mailed Jan. 13, 2010.

Notice of Allowance for U.S. Appl. No. 10/608,562 mailed Dec. 2, 2010.

* cited by examiner

SYSTEMS AND METHODS FOR GENERATING PAYMENT DUE NOTIFICATIONS

CROSS-REFERENCE TO RELATED APPLICATIONS

The present application is a continuation of co-pending U.S. patent application Ser. No. 10/608,562, filed Jun. 30, 2003 and entitled "A Technique for Calculating Payee Specific Time to Payment Completion," the contents of which are incorporated by reference herein in their entirety. The present application is also related to U.S. patent application Ser. No. 10/608,415 (Now U.S. Pat. No. 7,660,766), filed Jun. 30, 2003 and entitled "A Technique for Information Flow to Payees."

FIELD OF THE INVENTION

The present invention relates to electronic commerce, and more particularly to an electronic payment service.

BACKGROUND OF THE INVENTION

A biller is an entity that renders a service, or provides goods, to a customer on a credit basis, then, either simultaneously or subsequently, prepares and delivers a bill to request payment for the services or goods from the customer. Delivery of a bill can be completed by either traditional paper-based delivery, typically via a postal service, or electronic bill presentment. Electronic bill presentment is discussed further below. The customer, in turn, renders payment to the biller. Conventionally, bill payment has been by cash or check, although some billers have accepted payment by credit card.

Most bills have a due date. Some customers pay bills as close to a due date as possible, typically so as to retain control of funds as long as possible, while avoiding making payment late. Other customers coordinate payment timing with cash flow, also while avoiding making payment late. Late payment has associated negative consequences, which can include a penalty fee assessed by a biller, curtailment of a service, e.g., turning off a utility, and a negative impact to a customer's credit rating.

An electronic payment service provider is an entity that completes payment on behalf of a customer of that service provider. The customer on whose behalf a payment is completed is a payor, and an entity receiving the payment (often a biller) is a payee. A customer of service provider is known as a subscriber of the service provider. A subscriber can be an individual, a business, or another type of organization.

A service provider receives a payment request electronically, either directly from a subscriber, or from another entity acting on behalf of a subscriber. A payment request, at a minimum, specifies a payor (possibly indirectly), a payee (possibly by reference), and a payment amount. A payment date is also typically included, although it can be assumed to be "as soon as possible" if omitted. A payment request may be originated at any one of several electronic user interfaces, including automated telephone system interfaces, Web-based interfaces, PC application-based interfaces, PDA-based interfaces, and mobile phone-based interfaces.

After receipt of a payment request, a provider processes the request to complete the payment. At the conclusion of payment processing the service provider issues remittance to a payee. Remittance is a combination of a credit to a payee and remittance advice associated with the credit.

A credit accomplishes a transfer of funds to a payee to fulfill a payment request. A credit may be performed through a paper process (check or draft), or an electronic funds transfer (EFT) process. The funds may come directly from a demand deposit account associated with a subscriber, or from a demand deposit account associated with the payment service provider. A demand deposit account could be a checking account, a savings account, a money market account, or any other type account from which an account holder can at will issue an order that funds held therein be withdrawn for credit elsewhere. An electronic funds transfer is the process of causing funds to move between accounts at different financial institutions across one or more networks. A financial institution is an entity that maintains financial accounts that can be debited and/or credited as a result of transaction activity. Financial institutions include banks, savings and loans, credit unions, and brokerage houses. Networks linking financial institutions, as well as other entities, include the Federal Reserve's Automated Clearinghouse (ACH) network, MasterCard's® RPPS network, Visa's® ePay network, and Princeton's® eCom network. The Federal Reserve system is the central bank of the United States of America, formed by an act of Congress. It consists of twelve Reserve Banks located in major cities throughout the United States. The ACH electronically links the Federal Reserve Banks with financial institutions throughout the United States to support electronic funds transfer between the financial institutions. The RPPS, the ePay, and the eCom networks are examples of third party remittance networks, each of which links a service provider with a set of payees.

Remittance advice is a description of a credit that allows proper payment posting to a specific account, or sub-account, in a payee's Accounts Receivable ledger. Remittance advice may be tightly coupled with an instrument used to accomplish the credit (e.g., information printed in a memo field on a check or draft, or information included in a field in an electronic funds transfer file transmitted over a network linking financial institutions), or it may be somewhat decoupled from the credit, such as a paper document delivered to a payee, separate from a credit, or an electronic file transmitted directly to the payee separate from a credit. Remittance advice typically includes at least information identifying a payor, information identifying the payor's account with the payee, and a payment account.

A managed payee is a payee about whom a service provider has information that enables remittance to that payee to be handled in some improved/optimal fashion. The information typically includes one or more of account schemes for improved reliability of Accounts Receivable posting at the managed payee, account ranges for remittance center identification, other information for remittance center identification, preferred credit form (paper or electronic), preferred remittance advice form (paper or electronic), and electronic links for delivery of electronic credits and/or electronic remittance advice.

A managed payee provides this information to a service provider. The received information is typically stored in a managed payee database. A managed payee database includes information identifying each managed payee known to a service provider, along with the information received from each managed payee.

An unmanaged payee is a payee about whom a service provider does not maintain information which aids in the handling of remittance. An electronic payee is a managed payee about whom a service provider maintains information enabling remittance to be issued electronically. A merchant is a payee that issues bills for services rendered or goods purchased. Thus, a merchant is a special class of payee, a payee that issues bills. A merchant can be an unmanaged merchant, a managed merchant, or an electronic merchant.

For many service providers, payment processing dictates the form of remittance issued, i.e. electronic or paper. Some service providers use payment processing to determine a form of remittance based solely upon a status of a payee as a managed payee, with remittance issued in accordance with a managed payee's wishes. Thus, during payment processing, such a service provider determines if a payee identified in a payment request is a managed payee (or managed merchant). If so, information stored in a managed payee database is retrieved and remittance is issued in accordance with the stored information. If the retrieved information indicates that remittance should be issued electronically, the remittance is issued accordingly. And, if the retrieved information indicates that remittance should be issued on paper (check or draft), the remittance is likewise issued accordingly.

If a payee is not determined to be a managed payee, remittance will be issued on paper. In these cases, some service providers automatically issue a check drawn on a demand deposit account associated with such a payment service provider, typically known as a corporate check, as the form of remittance. Still other payment service providers perform risk processing to determine whether paper remittance will be a corporate check, or a draft drawn on a demand deposit account of a payor. A draft is a special class of check, one prepared by an entity other than an account holder of the account upon which the draft is drawn.

In risk processing, a payment request is evaluated against a set of rules that determines whether the credit can be issued "at risk" to the electronic payment service provider. An "at risk" credit is a credit from an account belonging to a service provider. Risk processing in only performed in those instances where a service provider is not assured of receiving funds in at least an amount of a payment made on behalf of a payor. If a determination is made that a payment will not be issued "at risk", payment is made by a draft drawn on a payor's demand deposit account prepared by a service provider. This could happen even if payment processing determined that the payment could have been issued electronically.

A service provider can be assured of receiving funds in a "good funds" model of payment processing. In a good funds model an electronic payment service provider performs a debit authorization against a payor's demand deposit account before issuance of a credit. That is, an electronic payment service provider first assures that funds from a payor's account are available before a credit is issued on behalf of that payor.

A service provider can also be assured of receiving funds in a "guaranteed funds" model of payment processing. In a guaranteed funds model an entity other than a service provider commits to reimburse the service provider for any credits issued for which an associated debiting of a payor's demand deposit account fails. The guaranteeing entity is typically the payee, although it may be another entity such as a consumer service provider, to be discussed further below, or a financial institution at which the payor's demand deposit account is maintained.

For other service providers a status of a payee as a managed payee is but one factor considered in payment processing to determine a form of remittance. Some service providers perform risk processing to determine if an "at risk" credit will be issued, which could cause remittance to be issued on paper (draft) even if the payee is an electronic payee.

Other service providers, potentially the same ones that also use the results of risk processing as a factor, first determine if a payee is an electronic payee, but then use the results of account scheming to determine a form of payment. Additionally, other criteria may be used in determining a form of payment, by these or other service providers.

Typically, a service provider has five mechanisms to complete payment to a payee on behalf of a payor. As discussed above, selection of a mechanism to complete payment is often made during payment processing. The first is ACH-ACH payment, which is all electronic, in which a service provider transmits both the credit portion and the remittance advice portion of remittance via the ACH network for delivery. The second is ACH-Direct Send payment, which is also all electronic, in which a service provider transmits the credit portion via the ACH network, and transmits the remittance advice portion directly to a payee via a network different than the ACH. Alternatively, in some ACH-Direct Send payments, remittance advice is delivered to a payee in hard copy. The third is Third Party payment, which is also all electronic, in which a service provider transmits both the credit portion and the remittance advice portion on to a third party remittance network for delivery. The fourth is Corporate Check payment, which is paper, in which a service provider delivers a check to a payee, the check being drawn on a demand deposit account belonging to the service provider. Printed remittance advice is printed upon or associated with the corporate check. The fifth is Draft payment, which also is paper, in which a service provider delivers a draft to a payee, the draft being drawn on a demand deposit account belonging to a payee and having printed remittance advice printed thereon or associated therewith.

FIG. 1A is a simplified depiction of the payment flow in completing payment to a payee on behalf of a payor utilizing ACH-ACH payment. At step 100 a service provider transmits an electronic funds transfer file, conventionally referred to as an ACH file, to the ACH network: The electronic funds transfer file includes a credit request and associated remittance advice. As desired, minimal remittance advice (similar to that printed on the face of a check or draft), or more detailed remittance advice, is included in the transmitted file, either as a memo note field in the credit request, or as separate but associated data. Currently, electronic funds transfer files must be transmitted onto the ACH network in batch. Some service providers store an indication in a payment history of the date and optionally time of the transmission. A payment history is a collection of information associated with each payment completed by a service provider. At a minimum, information in a payment history, for each included completed payment, includes information identifying a payee, information identifying a payor, a date and optionally time of remittance issuance, and a payment amount.

At step 105 the Federal Reserve receives the electronic funds transfer file and processes information included therein to identify the payee's financial institution. Via the ACH network, the credit request and remittance advice are then further transmitted to the payee's financial institution. The Federal Reserve acts as a huge switch, performing ACH transaction validation and propagating credit requests and associated remittance advice to appropriate financial institutions.

At step 110 the payee's financial institution receives the electronic funds transfer file. Upon receipt the payee's financial institution posts a credit in the amount of the payment to the payee's demand deposit account and beneficially sends the remittance advice to the payee, which might be a hard-copy delivery or an electronic delivery.

The payee receives and processes the remittance advice in step 115, which might be by electronic delivery, or by hard-copy delivery. Processing the received remittance advice includes posting the payment to the payor's account with the payee (crediting the payment amount to the payor's account). The amount of time between receiving remittance advice and a payee posting a payor's account varies among payees. At this point payment to the payee on behalf of the payor is completed. Either prior to, concurrent with, or subsequent to the service provider transmitting the electronic funds transfer file onto the ACH network, the service provider obtains funds at least in the amount of the payment from the payor. This can include electronically debiting a demand deposit account of the payor, credit account of the payor or stored value account of the payor in favor of a demand deposit account of the service provider. Also, this can include the service provider preparing and issuing a draft drawn on the demand deposit account of the payor payable to the service provider. It is also possible, though rare, for a service provider to bill a payor.

FIG. 1B is a simplified depiction of the payment flow in completing payment to a payee on behalf of a payor utilizing ACH-Direct Send payment. At step 101 a service provider transmits an electronic funds transfer file onto the ACH network. This electronic funds transfer file includes only a credit request, not remittance advice. As described above, some service providers store the date and optionally time that remittance is issued in a payment history. At step 101', substantially concurrent with step 101, the service provider electronically transmits remittance advice directly to the payee. Though not shown, the remittance advice could, as desired, be transmitted to a concentrator or lockbox processor providing a service to the payee. In this case, the payee would obtain the remittance advice directly from this entity, not the service provider. Also, the remittance advice could be delivered to the payee in hard copy. Typically, the transmitted remittance advice is tailored (as to content and/or structure) according to desires of the payee.

At step 106 the Federal Reserve receives the electronic funds transfer file and processes information included therein to identify the payee's financial institution. Via the ACH network, the credit request is then further transmitted to the payee's financial institution.

At step 111 the payee's financial institution receives the electronic funds transfer file. Upon receipt the payee's financial institution posts a credit in the amount of the payment to the payee's demand deposit account.

In step 116 the payee receives and processes the remittance advice. Processing the received remittance advice, as discussed above, includes posting the payment to the payor's account with the payee. At this point payment to the payee on behalf of the payor is completed. Either prior to, concurrent with, or subsequent to the service provider transmitting the electronic funds transfer file onto the ACH network, the service provider obtains funds at least in the amount of the payment from the payor, as described above.

FIG. 1C is a simplified depiction of the steps in completing payment to a payee on behalf of a payor utilizing Third Party payment. At step 102 a service provider transmits a third party electronic funds transfer file onto a third party remittance network. The particular remittance processor operating the third party remittance network defines the format for the third party electronic funds transfer file. At a minimum, the file includes information identifying the payee, information identifying the payor, and a payment amount. As above, some service providers may store the date and optionally time of the transmission of the electronic funds transfer file onto the third party remittance network in a payment history.

At step 107 the third party remittance network receives the transmitted third party electronic funds transfer file and processes payment to the payee based upon the contents of the file. The actual operations to deliver funds and remittance advice to the payee vary between third party networks. At some point the payee receives funds and remittance advice from the third party remittance network and posts the payment to the payor's account with the payee. At this point payment to the payee on behalf of the payor is completed. Either prior to, concurrent with, or subsequent to the service provider transmitting the third party electronic funds transfer file onto the third party remittance network, the service provider obtains funds at least in the payment amount from the payor, as described above.

FIG. 1D is a simplified depiction of the payment flow in completing payment utilizing a corporate check. At step 103 a service provider issues a corporate check drawn on a demand deposit account belonging to the service provider and payable to the payee in the amount of the payment. The corporate check includes remittance advice printed thereon (or associated therewith). The service provider causes the corporate check to be delivered to the payee, typically via postal delivery. Some service providers store the date and optionally time that a corporate check is issued, which could be time prepared, or time mailed.

At step 108 the payee receives the corporate check and then deposits the same into a demand deposit account maintained at a payee's financial institution. The payee's financial institution receives the deposited check at step 113 and posts a credit in the amount of the payment to the payee's account. Some financial institutions print a time and date a check is deposited onto the deposited check. To actually receive funds, the payee's financial institution then sends the corporate check to the service provider's financial institution that maintains the service provider's demand deposit account.

At step 118 the service provider's financial institution receives the corporate check and settles with the payee's financial institution. Typically, settlement involves the service provider's financial institution transmitting an electronic funds transfer file, including a credit in the amount of the payment, to the payee's financial institution via the ACH network. The service provider's financial institution also posts the corporate check against the service provider's demand deposit account (debiting the service provider's demand deposit account in the amount of the payment). As a part of posting, the service provider's financial institution records the date, if not also time, of the debiting.

The service provider's financial institution, at step 123, sends a periodic account statement to the service provider reflecting the posted debit, including at least the date, if not also the time, of the debiting. Periodic account statements are typically sent in paper form, though sometimes electronically. Many financial institutions make information found in account statements available to account holders via a Web-based interface, and/or telephone-based interface. Most financial institutions include actual cancelled checks with periodic account statements delivered in paper form. Images of canceled checks may be available with an electronic presentation of an account statement.

At some point subsequent to receipt of the corporate check, at step 128, the payee posts the payment amount to the payor's account with the payee. Typically, posting to a payor's account is done subsequent to the depositing of the check with the payee's financial institution. At this point payment to the payee on behalf of the payor is completed. Either prior to, concurrent with, or subsequent to the service provider issuing the corporate check, the service provider obtains funds at least in the amount of the payment from the payor, as described above.

FIG. 1E is a simplified depiction of the payment flow in completing payment to a payee on behalf of a payor utilizing a draft. At step 104 a service provider issues a draft drawn on a demand deposit account belonging to the payor and payable to the payee in the amount of the payment. The draft includes remittance advice printed thereon (or associated therewith). The service provider causes the draft to be delivered to the payee, typically via postal delivery. Some service providers store the date and optionally time that a draft is issued.

At step 109 the payee receives the draft and then deposits the same into a demand deposit account maintained at a financial institution. The payee's financial institution receives the deposited draft at step 114 and posts a credit in the amount of the payment to the payee's account. As noted above, some financial institutions print a time and date a check (draft) is deposited onto the deposited instrument. To actually receive funds, the payee's financial institution then sends the draft to the financial institution that maintains the payor's demand deposit account.

At step 119 the payor's financial institution receives the draft and settles with the payee's financial institution. The payor's financial institution also posts the draft against the payor's demand deposit account (debiting the payor's account). The service provider's financial institution, at step 124, sends a periodic account statement to the payor reflecting the posted debit, as discussed above.

At some point subsequent to receipt of the draft, at step 129, the payee posts the payment to the payor's account with the payee. Typically, posting to a payor's account is done subsequent to the depositing of the check with the payee's financial institution. At this point payment to the payor on behalf of the payee is completed.

Consolidated payments can be made utilizing any payment mechanism other than draft. In consolidated payment a service provider makes payment to a single payee on behalf of multiple payors utilizing a single credit. The remittance advice associated with a consolidated payment identifies each payor in association with each payment amount.

An electronic biller is a biller that presents at least a subset of its bills, for at least a subset of its customers, electronically, either directly or through a biller service provider (BSP). A biller service provider is an entity that electronically presents bills to customers of an electronic biller on behalf of the electronic biller. A biller service provider can also be an electronic payment service provider. Such service providers are known as electronic billing and payment (EBP) service providers. Electronic bill presentment can be via any one of several electronic user interfaces, including Web-based interfaces, PC application-based interfaces, PDA-based interfaces, mobile phone-based interfaces, and set-top box-based interfaces.

Some service providers only make payments to electronic billers on whose behalf those electronic payment service providers electronically present bills. Such payment service providers are said to offer a "closed" electronic payment service. A subscriber of such a service provider can only direct payment of bills that the service provider has electronically presented to the subscriber.

Other electronic payment service providers only make payments to electronic merchants. Such electronic payment service providers are also said to offer a "closed" electronic payment service. An electronic merchant may or may not be an electronic biller. That is, an electronic merchant does not necessarily bill customers electronically.

Still other service providers make payments to any payee, as long as the service provider knows the payee's name and address, typically obtained from a payor. Such service providers are said to offer an "open", or "pay anyone", electronic payment service. Of course, a payment to a payee that is not an electronic payee has to be a paper (check or draft) payment.

A payment request, dependent upon payment processing supported by a particular service provider, can include a payment date as "immediate", "future", or "recurring". For immediate payment dates, payment processing performed by a service provider is triggered promptly, such as at a next batch processing cycle. For future payment dates, a subscriber specifies a future date that directly or indirectly defines when payment processing is to begin. For recurring payment dates, a subscriber defines a recurring schedule of fixed-amount payments for either a finite or indefinite duration. Recurring payments are not especially suited for those payments that have varying due dates and/or amounts.

A subscriber-specified date in future-dated payment requests and recurring payment requests can, dependent upon a particular service provider, be either a process date or a due date. In a process date context, the subscriber-specified date triggers payment processing. The actual date on which a payee receives funds is dependent upon the type of remittance issued at the completion of payment processing. For payment of a bill, a payor must specify a payment date which takes into account payment processing and delivery time to ensure that the payee receives funds by the bill's due date.

In a due date context, the subscriber is specifying when a payee must receive funds. Thereinafter, a service provider determines when payment processing should start to ensure that funds are received by the subscriber-specified due date. A service provider often utilizes standard lead time to determine when payment processing should start. A service provider establishes a standard lead time by determining if a particular payee is an electronic merchant or an electronic payee. Often the standard lead time for electronic merchants and electronic payees is indicated as two days, and the standard lead time for non-electronic merchants and non-electronic payees is indicated as four business days. Standard lead times are based upon common knowledge that electronic information typically takes up to two days to reach a recipient, and that physical delivery of information typically takes up to four days to reach a recipient.

For immediate, future, and recurring payment dates a service provider cannot accurately and immediately inform a subscriber as to when payment will be completed. One reason is that payment processing is often utilized to determine a type of remittance, i.e., paper or electronic. Electronic remittance typically results in delivery of remittance to a payee in a shorter amount of time than paper remittance. For those service providers that perform payment processing in a batch mode at some time subsequent to receiving a payment request, these service providers cannot inform a subscriber, at the time the subscriber submits payment request, when remittance will be delivered to a payee, because the form of remittance is not known at the time, unless, of course, the service provider makes all, or most, payments according to a single payment mechanism.

Some service providers require that a subscriber establish a payee list. A payee list identifies payees a subscriber intends to pay utilizing services of the service provider. The process to establish an entry in a payee list is known as payee set-up. During payee-set up a subscriber provides to a service provider information identifying a payee, including at least the payee's name and address. The electronic payment service provider stores this information, often in a subscriber profile database, for later use in making payment to set-up payees.

For a payment request that originates at a Web-based interface, and sometimes other type interfaces, a subscriber's payee list is presented for the subscriber to select a payee for the payment request. Sometimes a presented payee list includes a standard lead time for each included electronic payee and each included non-electronic payee for the subscriber to utilize in determining a date of the payment request. That is, a presented payee list will have at most two different standard lead times, one for electronic payees and one for non-electronic payees. A presented lead time informs a subscriber that it may be expected that payment to a payee will be completed within a certain time frame-Standard lead time information is often stored with payee lists.

Another reason a service provider cannot accurately and immediately inform a subscriber as to when payment will be completed is that there is typically considerable variance between payees as to when received remittance will be posted in an Accounts Receivable ledger. Further, when remittance is paper, physical delivery of the remittance is typically out of control of the electronic payment service provider.

As a result of a service provider being unable to accurately and immediately inform a subscriber as to when a payment will be completed, a subscriber cannot retain control of funds for as long as possible, and cannot efficiently manage cash flow. Further, some payees receive late payment even when a payment request is submitted to a service provider prior to a due date of a payment. Consequently, a subscriber often has to assume a "worst-case" scenario and schedule the payment with more than the necessary lead time.

Accordingly, a need exists for a technique for an electronic payment service provider to accurately and immediately inform a subscriber as to when a payment to a payee will be completed.

Some service providers offer notification of pending due bill payments when those service providers electronically present those bills. Whenever an electronic bill is available for presentment the service provider presenting the bill transmits a notification to the appropriate subscriber that the electronic bill is available for viewing. This notification is sometimes an email notification, other times it is EBP application-based. In application situations a notification is not delivered to a subscriber until the subscriber accesses a service provider system via a network and provides log-in information, such as user name and password. Thereafter a notification is transmitted from the service provider system to the subscriber. Some service providers transmit a second notification if a payment request to pay a bill has not been received prior to a predetermined time before a due date of the bill. Other service providers transmit not only a notification of bill availability, but bill summary information, such as amount and due date, to a subscriber. Notices transmitted by some service providers also often include a link for submitting a payment request to pay the bill with which a notice is associated.

Other service providers offer the service of automatic payment of a bill. This service is known as autopay. In autopay, a biller transmits billing information, which may be bill summary information or bill detail information, to a service provider. Upon receipt, the service provider pays the bill on behalf of the subscriber without receiving a payment request to pay that particular bill. Oftentimes the received billing information is never electronically presented to the subscriber by the EBP service provider in autopay techniques. The subscriber provides the service provider with authorization to autopay a particular biller, and may even establish conditions for doing so.

As will be understood from the discussion above, the only bills that a subscriber might receive notification of having payment due, from an EBP service provider, are bills which that EBP service provider electronically presents. Further, no service provider that does not electronically present bills provides notification of payment being due.

Accordingly a need exists for a technique of notifying a subscriber of a due payment of a bill that is not electronically presented by a service provider.

Typically included in a biller's bill is posting information associated with a previous payment made by a customer, whether that be a payment made by the customer, or a payment made on behalf of the customer by a service provider. This posting information includes at least a date upon which the previous payment was applied to the customer's account with the biller. Some billers offer telephone-based or Web-based systems through which a customer can receive early posting information associated with a previous payment, no matter what entity made the payment.

The services offered by electronic payment service providers and EBP service providers have become widely accepted. Millions of bills are electronically presented to subscribers each month, and millions of payments are completed on behalf of subscribers each month. Many subscribers pay all of their bills utilizing an electronic payment service provider or an EBP service provider. Thus, a service provider has become a central point of bill payment activity for these subscribers.

Many subscribers desire to know, prior to receiving a next bill, when payments have been posted. These subscribers must, contact billers directly, as discussed above, to obtain posting information instead of receiving posting information from a service provider. Thus, even though a subscriber pays a bill utilizing an electronic payment service, and may even have received that bill from the service provider offering the electronic payment service, that subscriber must interact directly with a biller to obtain posting information prior to receiving a next bill. To date, no electronic payment service provider and no EBP service provider offers the service of providing early posting information to subscribers. At most, some service providers present completed payment information stored in a payment history to subscribers. This lets a subscriber know to whom a payment was made, the payment amount, and when remittance was issued, but not posting information. Some subscribers contact a service provider seeking early posting information, which is costly in customer service.

Accordingly, a need exists for a technique for a service provider, whether that service provider is an electronic payment service provider or an ERA service provider, to make early posting information available to a subscriber.

A claim arises when a payment, for some reason, cannot be correctly posted at a payee. This could be due to failure to properly deliver any portion of the payment to the payee, or failure of the payee to properly handle the received payment. For example, the payee does not properly identity a payor's account to credit. Typically, a claim will arise because the service provider based a payment on incorrect and/or incomplete information obtained from a subscriber during payee set-up. Also, some subscriber-provided information might be correct when it is provided during payee set-up, but due to changes made by a payee, it becomes incorrect and/or incomplete over time. These changes include, but are not limited to, payee name and address changes and account scheme changes.

Either a payee or a subscriber can bring a claim to the attention of a service provider. A payee brings a claim to attention oftentimes when the payee cannot identify the correct subscriber (customer/payor of the payee) with which to associate the payment received from the service provider. In some such instances, a payee might post a payment to a wrong account. In other such instances, a payee might actually return a payment to a service provider because the payee cannot identify any customer. A subscriber brings a claim to attention oftentimes when a payee does not post a payment in a timely manner, or at all.

Claim resolution is a process in which claims support personnel associated with a service provider aid in resolving a claim. That is, they work with the payee and/or the subscriber to ensure that a payment is correctly posted.

If a payment is posted by a payee to a wrong account, or posted to the correct account late, a service provider is not aware of this unless and until a subscriber brings a claim to the attention of the service provider. Also, if a payee cannot post a payment to any account, a service provider is not aware of this unless and until either a subscriber or a payee brings a claim to the attention of the service provider.

Unposted payment and untimely payment posting cost a subscriber in one or more of damaged credit rating, late fees, interest charges, and service interruptions. Claim resolution associated with unposted and untimely posted payments both service providers and payees in man-hours. There currently is no technique for a service provider to recognize that an issued payment has not been posted or timely posted without intervention from a subscriber and/or a payee.

Accordingly, a need exists for a technique for a service provider to ensure that an issued payment is timely posted without requiring a subscriber and/or a payee to notify the service provider of a posting problem.

Introduced above, payment service providers provide remittance advice to payees in association with payments made on behalf of subscribers. In each of the five payment mechanisms discussed above, remittance advice is received essentially concurrent with, or exactly concurrent with, a credit. A payment service provider issuing remittance has knowledge of the payment from the instance of processing a received payment request. However, a payee has no knowledge of the payment until remittance is actually received.

Payees, especially billers, often maintain information associated with received payments. Payees utilize this maintained information for a myriad of purposes, including, but not limited to, customer relationship management (CRM), customer service, and cash flow forecasting.

CRM techniques are utilized to maximize profits received from a payee. This includes tracking a payee's behavior, including purchasing habits and/or payment habits, to identify up-sell and cross-sell opportunities. Thus, maintained payment information is often utilized to identify payees that payors wish to target to maximize profits.

Customer service includes claim resolution, discussed above. Thus, maintained payment information is often utilized in resolution of payment posting problems, as well as resolution of other customer service issues. In cash flow forecasting a payee projects funds receipt based upon, among other factors, the timing of receipt of past payments. Thus, maintained payment information is often utilized to determine future income.

A payee cannot utilize information associated with a payment made by a payment service provider on behalf of a payor in CRM, customer service, and cash flow forecasting until that payee receives the payment from the payment service provider, even though the payment service provider has knowledge of the payment prior to issuing remittance to complete the payment. Accordingly, a need exists for a payment technique in which information associated with a payment is available for use by a payee prior to a payment service provider issuing the payment to the payee.

OBJECTS OF THE INVENTION

It is an object of the present invention to provide a technique to aid a payor in managing cash flow when making payments utilizing a service provider that makes the payments on behalf of the payor.

It is also an object of the present invention to provide a technique to accurately predict when a payee will receive a payment made by a service provider on behalf of a payee.

Another object of the present invention is to provide a technique for a service provider to notify a payor of a payment due to a payee when that service provider does not electronically present bills of the payee to the payor.

Yet another object of the present invention is to provide a technique for a service provider to notify a payor that a payee has posted a payment made by that service provider on behalf of the payor.

Still another object of the present invention is to provide a technique for a service provider to recognize that a payment issued by that service provider on behalf of a payor has not been timely posted by a payee.

Yet another object of the present invention is to provide a technique for a payee to utilize information associated with a payment prior to a payment service provider issuing the payment.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method and system for determining a period of time to complete a payment to a payee on behalf of a payor are provided. The present invention can be practiced by any entity which makes a payment on behalf of a payor, including, but not limited to, a financial institution and a payment service provider. A payment service provider is an entity that provides the service of paying a payee on behalf of a payor. That is, a payment service provider causes funds to be delivered to a payee, or account associated with the payee, on behalf of a payor. Completion of payment may be, as desired, understood as delivery of a payment instrument to the payee, depositing of a payment instrument by a payee, the electronic depositing of funds to a payee deposit account, another form of electronically crediting a payee, posting of a payment by the payee to a payor account with the payee, or settlement of a debit associated with a payment. A payment instrument could be a check or draft delivered to the payee. A draft is a special class of check that is prepared by an entity other than an account holder of an account upon which the draft is drawn. Electronic depositing of funds to a payee deposit account could include electronic debits via the ACH network, or any other network. Other forms of electronically crediting a payee include, but are not limited to, electronically crediting a payee via a credit card network. A payor can be any individual, business, or organization which makes payments. A payee can be any individual, business, or organization which receives payments.

The system of the present invention includes one or more communications interfaces, one or more memories, and one or more processors. Each communications interface is configured to receive and transmit information via at least one network. Information received by the communications interface is passed on to one of the set of processors, and the processor causes the communications interface to transmit information. The at least one network could be, but is not limited to, the Internet, a local area network, a wide area network, and the public switched telephone network, as well as any other network capable of transmitting information, including a wireless network. The set of memories is configured to store information identifying multiple accounts associated with a purchaser, and, as desired, other information. In certain embodiments of the present invention, the set of memories also stores sale detail information: The set of memories can include, but is not limited to, hard disk, floppy disk, and optical disk storage. The set of processors can compromise any type of processor capable of functioning to implement the method as described herein, including, but not limited to, a processor as found in a typical personal computer, main-frame computer, server-type computer, or any other type of computing device.

In accordance with the present invention, a record of a time that each of one or more payments to a same payee is issued is maintained. Each of the one or more payments is issued on behalf of one or more payors. The maintained time record could be a date, or as desired, could also include an hour, and perhaps minute, that a payment is issued. For those payments that are made by paper instrument, time issued preferably is the time that a payment is released for delivery, such as depositing with the United States Postal Service, or other delivery service. Of course, other times could also be designated as an issue time for paper payments, such as, but not limited to, the time that a payment instrument is printed. For electronic payments, time issued preferably is the time that an electronic funds transfer file directing payment to the payee is transmitted to initiate funds movement to the payee. Other, times could be designated as an issue time.

Post-issue event information associated with each of the issued one or more payments is received. Post-issue event information can include any information associated with a payment once that payment is issued. For paper payment instruments, post-issue event information could include one or more of, but is not limited to, the following events: a time that a payee receives the paper instrument, a time that a payee posts payment to a payor's account with the payee, a time that a payee deposits a paper payment instrument, and a time that a paper payment instrument is cleared by a financial institution at which an account on which the paper payment is drawn is maintained. Clearing of a paper instrument is sometimes called settlement. For electronic payments, post-issue event information can include one or more of, but is not limited to, the following events: a time that an electronic payment is credited to an account associated with a payee, a time that a payee posts payment to a payor's account with the payee, and time that a financial institution settles an electronic debit associated with the electronic payment. Of course, other post-issue event information, associated with either paper or electronic payments, could be received.

Utilizing the payment issue time information and the received post-issue event information, a period of time to complete a future payment to the payee is determined. A future payment is any payment not yet issued. This determination could be made after receipt of a payment request to pay the payee on behalf of a payor, or could be made unrelated to receipt of any particular payment request.

According to one aspect of the present invention, the received post-issue event information includes a plurality of types of post-issue event information. That is, the received post-issue event information is associated with two or more different events that occur subsequent to payment issue. Each instance of the received post-issue event information is associated with one of the two or more different events.

Each of the different event types is associated with a priority level. Thus, each event type has a priority relative to the other event types. The priority levels could be set by the entity determining the period of time, could be set by the payor, could be set by the payee, could be set by a consumer service provider with which the payor is associated, or could be set by any other entity. A consumer service provider is an entity that makes the service of issuing payments on behalf of a payor available to the payor, but itself may not perform the operations necessary to issue payments.

The received post-issue event information type having the highest priority level, of which multiple instances may have been received, is identified. The period of time to complete payment to the payee is then determined based upon the stored information and all received post-issue event information having the highest identified priority level. It should be stressed that the determination is made based upon information associated with payments to a particular payee, not other payees.

In another aspect of the present invention, the received post-issue event information includes a plurality of types of post-issue event information, and each of the types of post-issue event information is associated with a priority level, as described above. Additionally, each of the types of post-issue event information is also associated with a threshold number. A threshold number, which could be set by any entity, similar to the setting of priority levels discussed above, identifies a number of instances of receipt of a particular type of post-issue event information, for a particular payee.

In this aspect, the period of time is determined based upon the stored information and the received post-issue event information of the type having the highest priority and for which a number of instances of receipt of that type of information is greater than the threshold number associated with that type of post-issue event information. That is, the period of time to complete a payment to the payee is determined based upon the stored information and not necessarily the type of received information having the highest priority. Rather, the period of time is determined based upon the stored information and the highest priority post-issue event information available for which a certain amount of that type of information has been received. Thus, the period of time could be determined based upon the stored information and received post-issue event information having a lower priority than other received post-issue event information, if a sufficient amount of the higher priority post-issue event information has not been received. It is reiterated that the determination is made based upon information associated with payments to a particular payee, not other payees.

According to one aspect of the present invention, the received post-issue event information, associated with any of the one or more payments, includes at least one of three types of information. The first type of information is a time that the payee posts a payment to payor's account. The second type of information is a time that the payee deposits a payment instrument. The third type of information is a time that a financial institution settles a debit associated with a payment. Settlement can include a time that a check or draft is posted to an account upon which that instrument is drawn, and can include a time that an electronic debit is posted to an account from which an electronic payment is made. The time in each of these three types of information could be a date, or could also include an hour designation, as well as a minute designation.

In a further aspect of the present invention, post-issue event information that is posting information is received from the payee, post-issue event information that is deposit information is received from any one of the payee, a payor, and a financial institution, and post-issue event information that is settlement information is received from any one of the payor or a financial institution.

Thus, for posting information, the payee provides the time a payment is posted. This could be an automated process, or it could be a manual process, and could apply to paper payments as well as electronic payments.

For deposit information received from the payee, this could also be an automated or a manual process. Deposit information, no matter from whom received, necessarily applies to paper payment instruments. For deposit information received from a payor, this too could be an automated or a manual process. Though, typically, it will be a manual process, and typically associated with customer care support issues. A payor could come into possession of deposit time information in various ways, including the payee informing the payor of the deposit time of a check or draft, as well as the deposit time being printed on a draft, prepared by the entity issuing payment, drawn on a payee account. Deposit time information is often printed on a deposited paper instrument by the financial institution at which the instrument is deposited. Thus, whenever a payor receives a draft, or image thereof, included in a periodic bank statement, and that draft includes deposit time information printed thereon, the payor could use this as the source of deposit time information.

Deposit information will be received from the financial institution associated with the entity issuing payment to the payee for only those payments that are in the form of a check drawn on an account of that entity. As above, the deposit information will be found printed on a check, or image thereof, included in a bank statement.

For settlement information that is received from a payor, this too could be an automatic or a manual process, though typically it will be a manual process. Settlement information received from a payor will be associated with the time that the payor's financial institution posts a draft, prepared by the entity issuing payment, to an account of the payor.

For settlement information that is received from a financial institution at which an account associated with the entity issuing payment to the payee is maintained, this also could be an automatic or a manual process. Settlement information received from such a financial institution could be associated with either a payment that is a check, or an electronic payment. If a check, the settlement information is the time that this financial institution posts the check to an account. If the settlement information is associated with an electronic payment, the settlement information identifies the time that an electronic debit, associated with an electronic credit to the payee, is posted to the entity's account. Settlement information will typically be received in a paper bank statement. However settlement information could be received from a financial institution via an on-line presentation reflecting account activity.

In another further aspect of the present invention if received post-issue event information includes posting information, the period of time to complete a future payment is made based upon the stored information and posting information. However, if posting information is not available and the received post-issue event information includes deposit information, the period of time to complete a future payment is made based upon the stored information and deposit information. Finally, if posting and deposit information is not available, and the received post-issue event information includes settlement information, the period of time to complete a future payment is made based upon the stored information and settlement information. Thus, it is preferred, in this aspect, to determine the period of time based upon, first, posting information, then deposit information, and finally, settlement information.

In still another further aspect of the present invention an amount of received post-issue event information is utilized to as a factor in determining the period of time. In particular, a determination is made as to if posting information is received in association with a first predetermined number of payments made to the payee. If not, a determination is made as to if deposit information is received in association with a second predetermined number of payments made to the payee. If not, a determination is made as to if settlement information is received in association with a third predetermined number of payments made to the payee. The first, second and third predetermined numbers could each be the same number, could each be different numbers, or any two of the numbers could be the same. These predetermined numbers could be set by the entity issuing payment to the payee, or by any other entity.

In this aspect, if the number of payments for which posting information is received is greater than the first predetermined number, the period is determined based upon the payment issue time information and the posting information. If the number of payments for which posting information is received is not greater than the first predetermined number, but the number of payments for which deposit information is received is greater than the second predetermined number, the period is determined based upon the payment issue time information and the deposit information. If the number of payments for which posting information received is not greater than the first predetermined number, if the number of payments for which deposit information received is not greater than the second predetermined number, and if the number of payments for which settlement information is received is greater than the third predetermined number, the period is determined based upon the payment issue time information and the settlement information.

In yet another further aspect of the present invention, if the number of payments for which posting information is received is less than a predetermined number of payments, the period is determined based upon the stored payment issue time information, received posting information, and at least one of received deposit information and received settlement information. Thus, in this aspect, if a predetermined amount of posting information is not received, the determination is still made based upon received posting information, but also with at least one of deposit information and settlement information. This predetermined number of payments could be set by any entity.

In still another further aspect of the present invention the period to complete a future payment is determined based upon an average period of time between payment issuance and one of payment posting, payment depositing, or payment settlement. The average period of time could be the determined period, or could be used to determine the period. For those determinations made based upon posting information, the period is determined based upon an average time between the issuing of each of multiple payments and the payee posting each payment. For those determinations made based upon deposit information, the period is determined based upon an average time between the issuing of each of multiple payments and the payee depositing each payment. And, for those determinations made based upon settlement information, the period is determined based upon an average time between the issuing of each of multiple payments and a financial institution clearing a debit, which could be electronic or paper, associated with each payment.

In an even further aspect of the present invention, if the period to complete payment is made based upon deposit or settlement information, the determined average period is adjusted. In particular, an adjusted time period, which could be negative or positive, is added to the determined average period to arrive at an adjusted determined period. In such cases, the adjusted determined period is the determined period of time to complete a future payment to the payee. The adjustment period could be different for determinations made utilizing deposit information than for those made utilizing settlement information, or the adjustment periods could be the same. Beneficially, an adjustment period is utilized to estimate a time of posting based upon received deposit or settlement information.

According to another aspect of the present invention a form of payment is determined. The determined form of payment could be draft, check, or electronic. Those of the one or more payments having the determined form are then identified. In this aspect, only payment issue time information associated with payments having the identified form and received post-issue event information associated with those payments having the identified form is utilized in determining the period of time to complete a future payment.

In a further aspect of the present invention a payment request to pay the payee on behalf of payor is received. After receipt of the request, information is transmitted to the payor identifying the determined period of time, based upon the determined payment form. Then, responsive to the transmitted time period information, a date for payment processing to begin is received from the payor. Thereafter, payment processing is initiated on the date specified by the payor and payment is issued at the conclusion of the payment processing. Thus, the payor schedules payment to the payee based upon a determined period of time required to complete payment to the payee. Beneficially, the form of payment can be determined, as desired, either prior to, or subsequent to, receipt of the payment request.

In yet another aspect of the present invention a payment request to pay the payee on behalf of a payor by a due date is received. A time to issue the payment such that the payment request will be fulfilled by the due date is determined. This time to issue is determined based upon the determined period of time to complete a future payment. The period of time to complete a future payment could be determined prior to, or subsequent to, receiving the payment request. A payment is issued to the payee at the determined time. The determined time could be a date, or could also designate an hour, and perhaps even minute.

In another aspect of the present invention, a period of time to complete a payment to the payee in each of a plurality of forms of payment is determined based upon the stored information and the received post-issue event information. The plurality of forms of payment could include, in addition to other forms of payment, payment by check, payment by draft, electronic payment via the ACH network, and electronic payment via a credit card network.

Also in this aspect, a payment request to pay the payee on behalf of a payor is received. Responsive to receipt of the payment request, information identifying at least two of three payment options is transmitted to the payor for the payor to select one. The payment options are any two of a first, second, and third payment option. A payor selection of an option is received, and payment is issued to the payee in accordance with the selected option, not an unselected option.

In the first option, pre-posting information is transmitted to the payee prior to the payment being issued to the payee on behalf of the payor. The pre-posting information, which is preferably transmitted electronically, via perhaps a system interface, fax, email, or telephone, though it could be a hard copy transmission, includes information identifying at least one of a bill, the payor, and an amount the payor has requested to be paid to the payee. Identification may be direct or indirect. Further, the pre-posting information could encapsulate more than one of the possible elements listed above. For example, if the payment is a bill payment, the transmitted pre-posting information could be information identifying a bill directed to the payor by the payee. This information, in this example, is usable by the payee to identify both the payor and the payment amount. Other examples of transmitted pre-posting information are within the scope of the present invention.

The pre-posting information is transmitted to the payee prior to making payment to the payee, which could be, as desired, in any of the plurality of forms of payment. Thus, the pre-posting information informs the payee that the payor has requested that the payee be paid on behalf of the payor. The pre-posting information is not remittance information associated with a payment. Rather, the pre-posting information is associated with the received payment request.

In the second option, a payment to fulfill the received payment request is completed in accordance with one of the plurality of forms of payment having a shorter determined period of time than a second one of the plurality of forms of payment. That is, the payment is completed as quickly as possible based upon the determined periods of time. It should be noted that the form of payment having the absolute shortest period of time to completion might not be the form of payment in which the payment is issued. That is, the absolute shortest period of time might not be available due to, for example, a failure of risk processing or account scheming. The payment is issued essentially immediately relative to the receipt of a selection of this option, in a form of payment that completes payment quicker than another form of payment.

In the third option, the payor determines a time for a payment to fulfill the received payment request to be issued to the payee. The payor-determined period of time is not dependent upon a shortest determined period of time. The payor-determined time could be a future time, or could be a time essentially immediate to receipt of the payor selection. It should be stressed that this option is different than the second option in that the payor is not selecting the fastest possible time to payment completion, but rather is selecting standard operations to issue payment on behalf of the payor to the payee.

In a further aspect of the present invention, the transmitted option information associated with at least one of the first option and the second option identifies a cost to the payor associated with issuing payment in accordance with the option. That is, at least one of first option and the second option is a value-added option to the payor. The payor will incur a cost if a value-added option is selected.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 2:
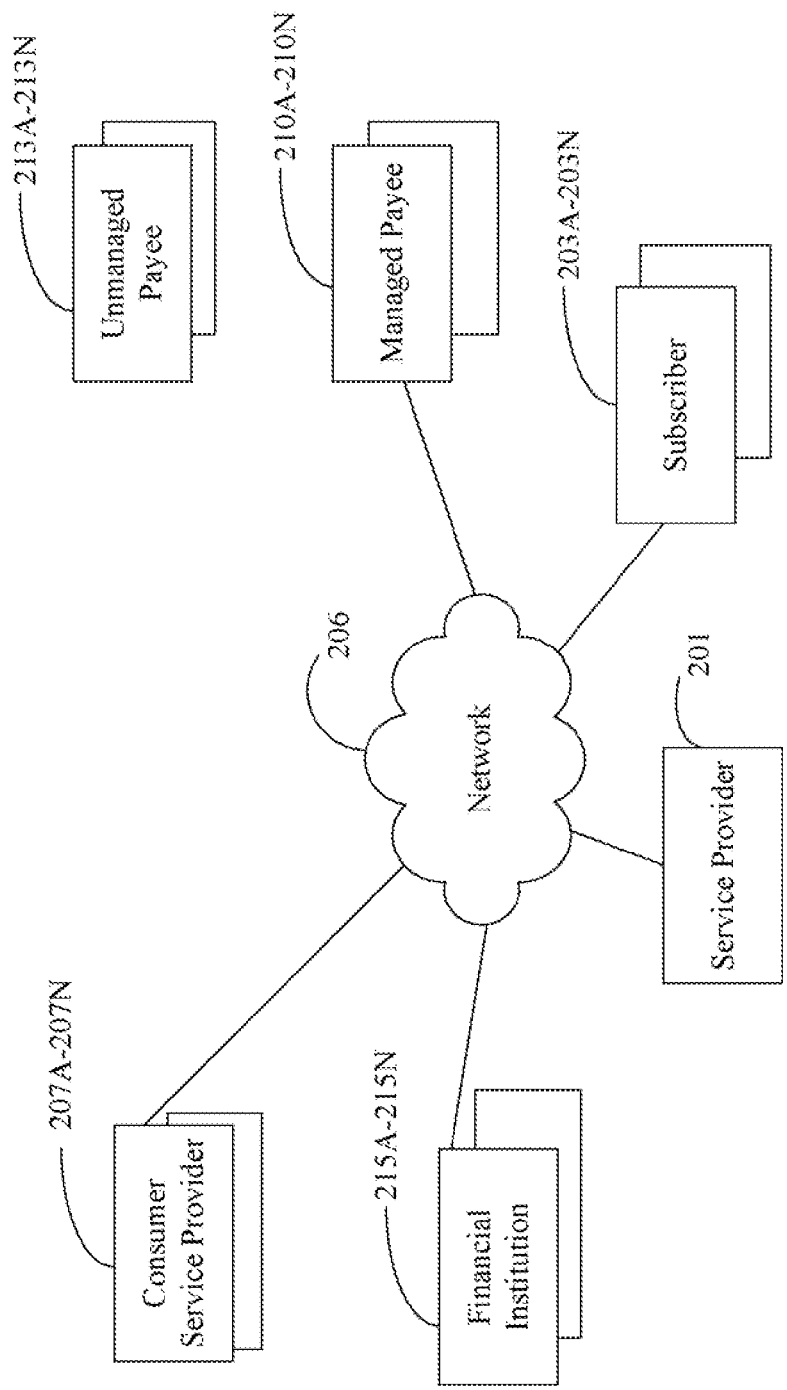
FIG. 2 depicts an electronic payment network in accordance with certain aspects of the present invention.

FIG. 2 depicts a service provider 201 of at least an electronic payment service. The service provider 201 could, as desired, also provide an electronic bill presentment service, as well as other electronic commerce services. Thus, the service provider 201 is at least an electronic payment service provider, and could, as desired, be an electronic billing and payment service provider.

The service provider 201 provides the payment service to one or more subscribers 203A-203N. Subscribers 203A-203N communicate with the service provider 201 via a network 206. The network 206 preferably is the Internet, though it could be another public network, or even a private network. Further, the network 206 could be multiple networks.

A subscriber 203A-203N, in some instances, communicates directly with the service provider 201. In other instances, a subscriber 203A-203N communicates with the service provider 201 through one of consumer service providers 207A-207N.

A consumer service provider 207A-207N is an entity that offers a payment service directly to certain ones of subscribers 203A-203N, while the service provider 201 provides some supporting functionality, i.e., payment processing and remittance issuance, of completing payments. A consumer service provider 207A-207N may, as desired, present a payment service user interface to a subscriber 203A-203N to provide information to, and receive information from, a subscriber 203A-203N. In such instances, such a consumer service provider 207A-207N receives information from the service provider 201, via the network 206, and then presents such information to a subscriber 203A-203N. Likewise in such instances, a consumer service provider 207A-207N receives information from a subscriber 203A-203N, and then passes such information to the service provider 201 via the network 206. Communications between a subscriber 203A-203N and a consumer service provider 207A-207N can, as desired, be via the network 206, via another network, or otherwise.

In other situations in which a consumer service provider 207A-207N offers the payment service, the service provider 201 provides a payment service user interface directly to a subscriber 203A-203N, via the network 206, that is branded as belonging to a consumer service provider 207A-207N. A consumer service provider is also known as a sponsor.

Also shown in FIG. 2 is one or more unmanaged payees 213A-213N. An unmanaged payee 213A-213N and the service provider 201 do not have a relationship. Because of the lack of a relationship, FIG. 2 does not depict unmanaged payees 213A-213N in communication with the network 206.

FIG. 2 also depicts one or more managed payees 210A-210N. As discussed above, a managed payee 210A-210N is a payee about whom the service provider 201 maintains information that enables remittance to that managed payee to be handled in some improved and/or optimal fashion, such as electronically via the network 206 and/or via another network, It is not required that each managed payee communicate via the network 206, or via any other network.

Also shown in FIG. 2 is one or more financial institutions 215A-215N. At least one of the financial institutions 215A-215N maintains one or more demand deposit accounts belonging to the service provider 201. Preferably, a financial institution 215A-215N maintaining a service provider 201 account communicates with the service provider 201 via a network, depicted here as one of the family of networks represented by network 206. However, not all aspects of the present invention require such electronic communication. Also, each of the subscribers 203A-203N is associated with at least one respective demand deposit account maintained at one of the financial institutions 215A-215N. Furthermore, each of the unmanaged payees 213A-213N and each of the managed payees 210A-210N is associated with at least one respective demand deposit account maintained at one of the financial institutions 215A-215N. The present invention does not require that each financial institution 215A-215N communicate via the network 206.

Figure 3:
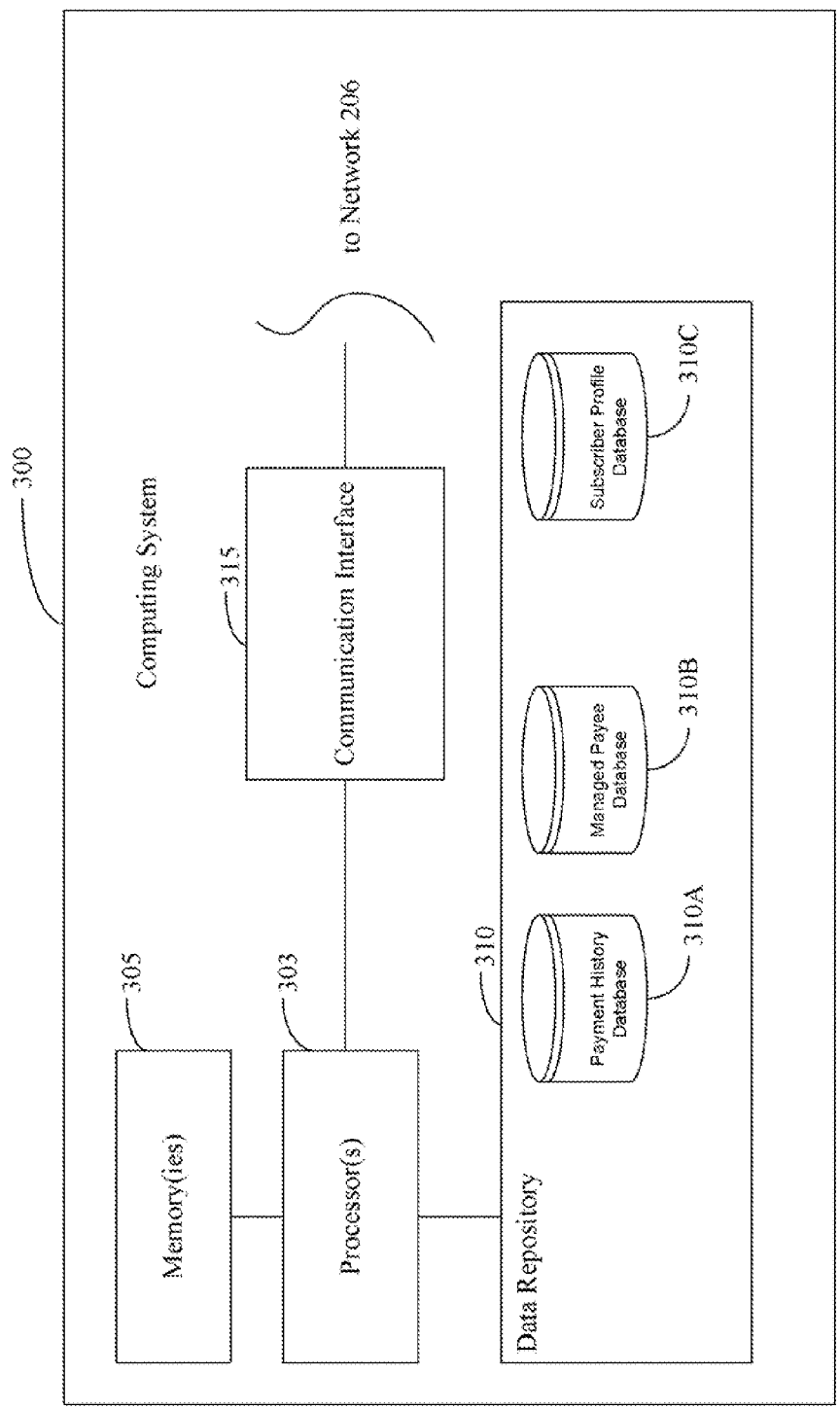
FIG. 3 is a simplified block diagram of a computing system associated with the service provider of FIG. 2 in accordance with certain aspects of the present invention.

The service provider 201 maintains a computing system, shown in FIG. 3, to support the payment service of the present invention. Computing system 300 includes at least one processor 303 configured to execute programming instructions stored in at least one memory 305. The computing system 300 also includes a data repository 310 configured to store data necessary to provide the payment service. Also shown in FIG. 3 is at least one communication interface 315 for transmitting and receiving data at least via the network 206. As desired, a communication interface 315 also transmits and/or receives data via one or more networks other than the network 206.

The data repository 310 includes a payment history database 310A that stores information associated with each payment completed by the service provider 201 on behalf of each subscriber 203A-203N. The payment history database 310A will be further discussed below. The data repository 310 also includes a managed payee database 310B that stores information associated with managed payees 210A-210N. The managed payee database 310B will be further discussed below. The data repository 310 also includes a subscriber profile database 310C that stores information associated with subscribers 203A-203N. The subscriber profile database 310C will be further discussed below. Other information is also stored in the data repository 310, though not shown in FIG. 3.

Proactive Payment Due Notification

In one aspect of the present invention, the service provider 201 provides a notification to a subscriber 203A-203N of a projected payment being due to a payee. This payee could be a managed payee 210A-210N or an unmanaged payee 213A-213N. There is no requirement that the service provider 201 ever have received billing information from any payee for any subscriber 203A-203N for the service provider 201 to notify a particular subscriber that a payment may be due to a payee. At a minimum, all that is required is that a subscriber 203A-203N have directed the service provider 201 to make at least one payment on his or her behalf. In this aspect, the service provider 201 determines an expected date of receipt of a payment request and notifies a subscriber (payor) that a payment may be due to a particular payee.

The payment history database 310A stores information associated with each payment completed by the service provider 201. The stored information associated with each completed payment, in this aspect of the invention, includes at least information identifying the subscriber 203A-203N on whose behalf the payment was made, information identifying a payee of the payment, which could be a managed payee 210A-210N or an unmanaged payee 213A-213N, information identifying a date a payment request giving rise to the payment is received, and a payment amount.

Also included in the data repository 310 is a collection of proactive payment due control parameters. These control parameters can, as desired, be stored in table form, or in some other form such as one or more files. Control parameters can, as desired, exists at one or more of multiple levels. A first level is a payor-payee specific level. The scope of control parameters on this level is limited to specific payor-payee combinations. That is, each control parameter at this level only applies to a particular payor-payee combination. A second level is a global payor level. The scope of control parameters on this level is limited to all payees of a specific payor. That is, each control parameter at this level only applies to payees of a particular payor. A third level is a consumer service provider level (also known as a sponsor level). The scope of control parameters, on this level is all payor-payee combinations in which a sponsor makes the payment service available to a payor of the payor-payee combination. A fourth is a system level. The scope of control parameters on this level is for all payor-payee combinations known to the service provider 201. Each control parameter on this level applies to all payor-payee combinations.

Examples of control parameters include parameters dictating the number of times to notify a payor of a projected payment being due, a time interval between re-notifications, a period of payment history to examine, a timeframe in advance of a projected date of receipt of a payment request in which to issue a notification, and whether a notification should be transmitted to a payor via email or "in application". The service provider 201, as desired, can also utilize other proactive payment due control parameters.

Service provider personnel set, modify, and/or delete system level and sponsor level control parameters, as appropriate. Payor-payee level and global payor level control parameters are preferably set, modified, and/or deleted by payors themselves though a user interface presented to a payor (subscriber) via the network 206 by the system 300. Payor-payee level control parameters could, as desired, be set, modified, and/or deleted via a payee setup user presentation presented to a payor. Service provider personnel could also, as desired, set, modify, and/or delete payor-payee level and global payor level control parameters on behalf of payors.

Figure 4A:
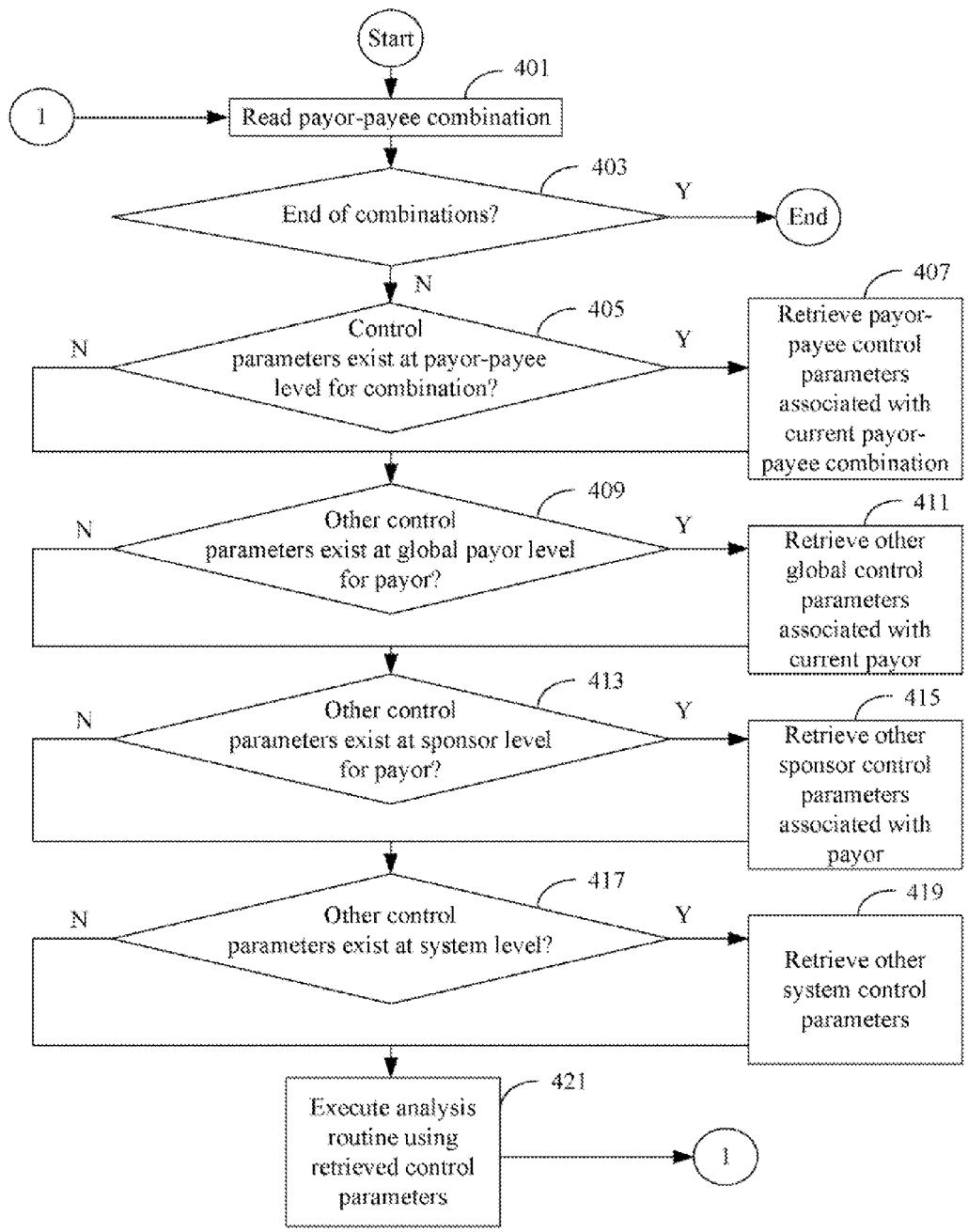
FIG. 4A is a simplified flow diagram of operations performed by the computing system of FIG. 3 in accordance with certain aspects of the present invention.
Figure 4B:
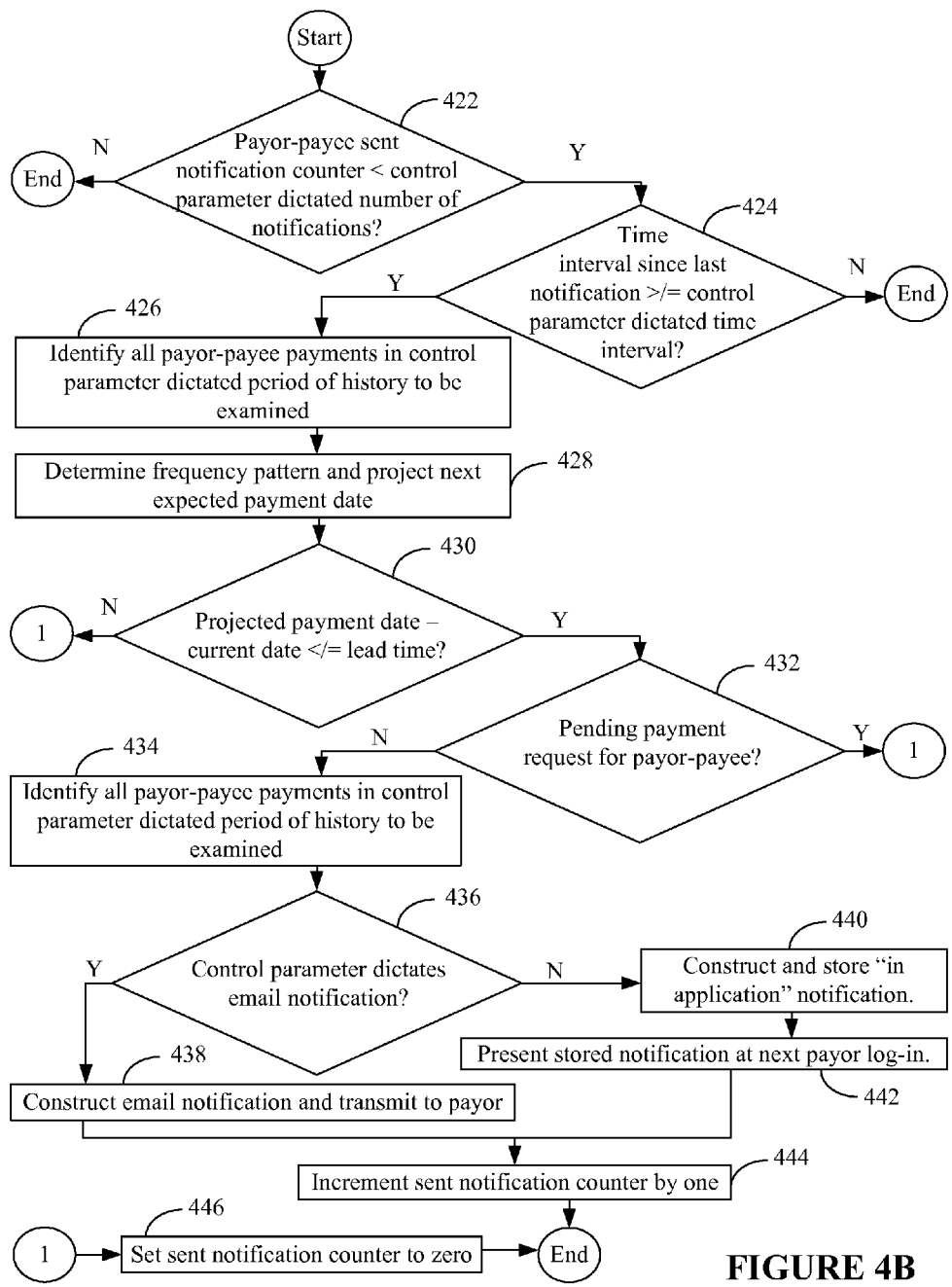
FIG. 4B is a simplified flow diagram of other operations performed by the computing system of FIG. 3 in accordance with certain aspects of the present invention.

FIGS. 4A and 4B depict exemplary operations performed by the service provider processor 303 in notifying a payor of a projected payment being due. FIG. 4A depicts selecting control parameters to utilize, and FIG. 4B depicts determining whether and when to notify a subscriber 203A-203N utilizing the selected control parameters.

The operations depicted in FIGS. 4A and 4B are preferably performed on a periodic basis, such as daily. However, as desired, the operations could be performed in an ad hoc manner. Each payor-payee combination included in the payment history database 310A is examined to determine a projected payment being due. A payor-payee combination is associated with at least one, if not more than one, completed payment reflected in the payment history database 310A. Beneficially, though not required, the payment history database 310A includes a list of all payor-payee combinations associated with completed payments stored in the payment history database 310A. Such a list is especially useful in the operations depicted in FIG. 4A.

At step 401 a service provider processor 303 accesses the payment history database 310A and reads a payor-payee combination. The processor 303, at step 403, determines if the end of the payor-payee combinations has been reached. That is, the processor 303 determines if each possible payor-payee combination reflected in the payment history database 310A has been processed. If all combinations have been processed, operations depicted in FIG. 4A end.

If all combinations have not been processed, at step 405 the processor 303 accesses the stored control parameters in the data repository 310 and determines if any control parameters exist at the payor-payee level for the particular payor-payee combination. If not, operations continue with step 409. If so, the one or more control parameters associated with this particular payor-payee combination are retrieved at step 407. Operations continue with step 409.

At step 409 the processor 303 determines if any global payor level control parameters associated with the current payor, other than any control parameters retrieved at step 407, are stored in the data repository 310. If so, at step 411 the processor 303 retrieves one or more stored global payor level control parameters associated with the current payor. These control parameters apply to any payor-payee combination involving the current payor. Operations continue with step 413. If no global payor level control parameters associated with the current payor exist, operations continue with step 413, At step 413 the processor 303 determines if any consumer service provider (sponsor) level control parameters for the current payor, other than any control parameters retrieved at step 407, or step 411, are stored in the data repository 310. If so, at step 415 the processor 303 retrieves one or more stored sponsor level control parameters associated with the current payor. Operations continue with step 417. If no sponsor level control parameters for the current payor exist in the data repository 310, operations continue with step 417.

At step 417 the processor 303 determines if any system level control parameters, other than any control parameters retrieved at step 407, step 411, or step 415, are stored in the data repository 310. If so, at step 419 the processor 303 retrieves one or more system level control parameters. Operations continue with step 421, in which an analysis routine utilizing the retrieved control parameters is performed to determine if a notification of a projected payment due date will be presented to the current payor associated with the current payee. If no other system level control parameters are stored in the data repository 310, operations continue with step 421 following step 417. The operations performed in step 421 are detailed in FIG. 4B and discussed below. The analysis routine can, as desired, be performed immediately, subsequent to either step 417 or step 419, or at a later time.

As will be apparent from the discussion above, if any particular control parameter exists at multiple levels, once that control parameter is retrieved from one level, it will not be retrieved from another level. For example, if a first version of a control parameter dictating a number of times to notify a particular payor exists at the payor-payee level and a second version of that control parameter also exists at the at the sponsor level, because that first version is retrieved at step 407, the second version is not be retrieved at step 419. In the example of FIG. 4A, the preferred precedence ordering prioritizes the payor-payee level above the global payor level, the global payor level above the sponsor level, and the sponsor level above the system level. A different precedence ordering is certainly conceivable and possible.

An exemplary analysis routine utilizing the retrieved control parameters is depicted in FIG. 4B. At step 422 a service provider processor 303 accesses a sent notification counter that is associated with a particular payor-payee combination. Each payor-payee combination is associated with a separate sent notification counter. Sent notification counters are preferably stored in the data repository 310. As desired, sent notification counters could be stored in the subscriber profile database 310C, each in association with other information associated with a subscriber 203A-203N with which each counter is associated. Once the processor 303 accesses the appropriate sent notification counter, the processor 303 determines if the count is less than a retrieved control parameter dictated number of times to notify a subscriber that a projected payment is due. If the count is not less than a control parameter dictated number, operations end.

If the count is less than a control parameter dictated number, at step 424 the processor 303 determines if a time interval since a last sent notification is greater than or equal to a retrieved control parameter dictated time interval between notifications. If not, operations end.

If the time interval since the last notification is greater than or equal to a retrieved time interval, operations continue with step 426, in which the processor 303 accesses the payment history database 310A and identifies each payment including the current payor-payee combination that falls within a control parameter dictated period of history to be examined. At step 428 the processor 303 determines a frequency pattern of the identified payment, or payments, and projects a next expected payment date. If only one payment is identified, a frequency of monthly is preferably assumed. However, as desired, a different frequency could be assumed. Alternatively, as desired, a frequency of a single identified payment could be dictated by a control parameter.

Determining a frequency pattern involves, for the period of history being examined, determining when the service provider 201 paid the payee, such as once a week, once a month, once a quarter, or perhaps once a year. That is, the processor 303 determines the period of time between payment dates associated with payment requests from the payor.

Once a frequency pattern is determined, further statistical modeling is performed by the processor 303 to determine the next expected payment date. In one example, the processor 303 determines an average of the payment dates during the period being examined. Of course, further statistical modeling could, as desired, be performed utilizing this average date to determine the next expected payment date. The further modeling can include, as desired, determining if any given payment date is more than a predetermined time away from the determined average. If so, that payment is excluded from consideration and the average is recalculated.

As an example of averaging, if the determined frequency pattern is weekly, the service provider assigns each day of a week a number. Then, each number corresponding to a day of the week of a payment date is added together and divided by the total number of payment dates. Thus, Sunday could be assigned "1", Monday assigned "2", and so on, with Saturday assigned "7". If the period examined is four weeks, and the payment date for the first week is a Monday (2), and the payment date for the second week is a Wednesday (4), and the payment date for the third week is a Tuesday (3), and payment date for the fourth week is a Friday (6), a total of these days equals 15. The processor 303 divides 15 by the number of payments (4), to arrive at 3.75. This is then rounded to the nearest whole number, 4. The number 4 is associated with the day of Wednesday, which would be the average payment date over the four-week period. In this example, the projected next payment date would be the next Wednesday.

As another example of averaging, if the determined frequency is monthly, the processor 303 adds together the days of the month of the days associated with each payment date. Then, this figure is then divided by the total number of payment dates to determine an average payment date for the period.

After the next expected payment date has been calculated, at step 430 the processor 303 determines if the projected payment date minus the current date is less than or equal to a notification lead time dictated by a retrieved control parameter. Notification lead time refers to a timeframe in advance of a projected payment date in which to send a notification. If the projected payment date minus the current date is greater than the notification lead time, operations continue with step 446.

If the projected payment date minus the current date is less than or equal to the lead time, at step 432 the processor 303 accesses the data repository 310 and determines if a pending payment request to pay the payee has been received from the payor. That is, the processor 303 determines if the payor has already requested that a payment be made to the payee, but that payment request has not been processed. If so, operations continue with step 446. If not, operations continue with step 434.

At step 434 the processor 303 determines an average monetary amount of the payments to the payee completed by the service provider 201 on behalf of the payor in the time period being examined. At step 436 the processor 303 determines if a retrieved control parameter dictates that a notification of an expected payment being due be sent to the payor via email. If so, at step 438 the processor 303 constructs an email message notifying the payor of the expected payment and causes a communication interface 315 to transmit the constructed message to the payor, preferably via the network 206. Following transmission of the email, operations continue with step 444, in which the processor 303 increments the appropriate sent notification counter by one. Thereinafter, operations end.

If at step 436 it is determined that the notification will not be transmitted via email, at step 440 the processor 303 constructs and stores an "in application" notification. The "in application" notification is presented to the payor the next time the payor logs-in with the service provider 201 via a user interface, step 442. Following step 442 Operations continue with step 444, discussed above.

A notification, whether it be transmitted via email, or presented "in application", preferably includes a link to a payment interface. The payment interface includes a payment request presentation with fields pre-populated with the payee's name, the projected payment date, and the estimated payment amount. Each of these fields can be modified by the payor. The pre-populated information is stored in the data repository 310 until presentation.

Automatically Adjusted Lead Times

In this aspect of the present invention, the service provider 201 estimates a time to completion of a payment to a payee made by the service provider 201 on behalf of a subscriber 203A-203N. A subscriber 203A-203N can beneficially utilize the estimated completion time in scheduling payments to be completed by the service provider 201. Alternatively, the service provider 201 may automatically adjust the latest day a payment can be scheduled from a global or "worst-case" scenario to a payee-specific value.

In support of the estimation process, the payment history database 310A is configured to store information associated with multiple events that occur after the service provider 201 issues remittance, to be referred to herein as post-issuance events. Also in this aspect, the payment history database 310A includes information identifying whether the credit portion of remittance was issued electronically via the ACH, electronically via a third party remittance network, via corporate check, or via draft. Additionally, a payment identifier for each payment reflected in the payment history database 310A is included.

In addition to the above-described information, the payment history database 310A also includes, for each payment reflected in the database, information identifying the subscriber 203A-203N (payor) on whose behalf the payment was made, information identifying a payee of the payment, information identifying the payment amount, and information identifying a date, and optionally time, at which the service provider 201 issued remittance associated with the payment.

The post-issuance events associated with a corporate check are a date that the corporate check clears, a date that a payee deposits the corporate check, and a date that a payee posts a payment to a payor's account with the payee. Date information may include not only a date, but also a time the event occurs. As will be apparent from the discussion below, not every payment reflected in the payment history database 310A will be associated with each of the post-issuance events in the payment history database 310A. Further, some of the reflected payments will not be associated with any of these post-issuance events in the payment history database 310A. The processing to be described further below takes into account whether the payment history database 310A includes any information associated with post-issuance events for reflected payments, and if so, which post-issuance events, in estimating a time of completion of a payment.

The service provider 201 obtains corporate check clearing date and optional time information from a periodic account statement delivered to the service provider 201 by the financial institution 215A-215N at which the demand deposit account upon which the corporate check is drawn is maintained. This delivery can, as desired, be by electronic means via the network 206, or be by traditional hard copy delivery. The service provider 201 obtains corporate check deposit date and optional time information from a cancelled corporate check included in a periodic account statement delivered to the service provider 201 via traditional hard copy. As should be apparent, the payment history database 310A will only include clearing information and deposit information for those payments that are completed utilizing the corporate check payment mechanism. Further, the payment history database 310A will only contain deposit information for those corporate check payments in which a payee's financial institution prints deposit date and optional time information on a deposited corporate check, and then only for those corporate check payments in which checks, or images thereof, having deposit information printed thereon are returned to the service provider 201.

The service provider 201 obtains posting information directly from a payee, as a result of one of two processes. The first process is claim resolution. The second process is payment posting notification.

In aiding a payee in claim resolution the service provider 201 often gathers post-issuance event information from the payee. This information can include, but is not limited to, a date and optionally time that the payee received the remittance, a date and optionally time that the payee deposited paper remittance, which could be a corporate check or draft, and a date and optionally time that the payee attempted to post the payment. Gathered information is stored in the payment history database 310A in association with the payment with which that information is associated. Because a human operator receives post-issuance event information gathered during claim resolution, that information must be manually input into the payment history database 310A utilizing a user I/O interface, not shown in FIG. 3.

It should be noted that information gathered during claim resolution will typically vary from instance to instance, and in some instances it is possible that no information will be gathered in claim resolution. A payment giving rise to claim resolution processing could be a payment completed according to any of the five payment mechanisms described above.

Additionally, it should be noted that the service provider 201 might obtain posting information directly from a payor during claims resolution. Specifically, the information may include the date and optionally time a payee deposited a draft (from the information printed by the payee's financial institution on the deposited draft) and the date and optionally time that the draft cleared.

In payment posting notification processing, a managed payee 210A-210N provides posting information to the service provider 201 that indicates a date, and optionally also a time, that a payment received from the service provider 201 on behalf of a payor is credited to the payor's account with that payee. The provided posting information also includes at least information identifying the payee and information identifying the payor. Beneficially, though not required in all aspects of the present invention, posting information includes a payment identifier and the date, and optionally also the time, that the remittance advice portion of the payment is received by the payee.

Other information can, as desired, be included in received posting information, including, but not limited to, any of, or all of the remittance advice associated with the posted payment, such as a payor account number with the payee and the payment amount. Additionally, the received posting information could, as desired, include updated account balance information. Posting information can be received by the service provider 204 from a managed payee 210A-210N via the network 206, or via another means, such as phone, email, fax, or postal delivery. The received posting information is stored in the payment history data repository. If posting information is not received electronically, a human operator manually inputs it in the payment history database 310A.

Figure 5:
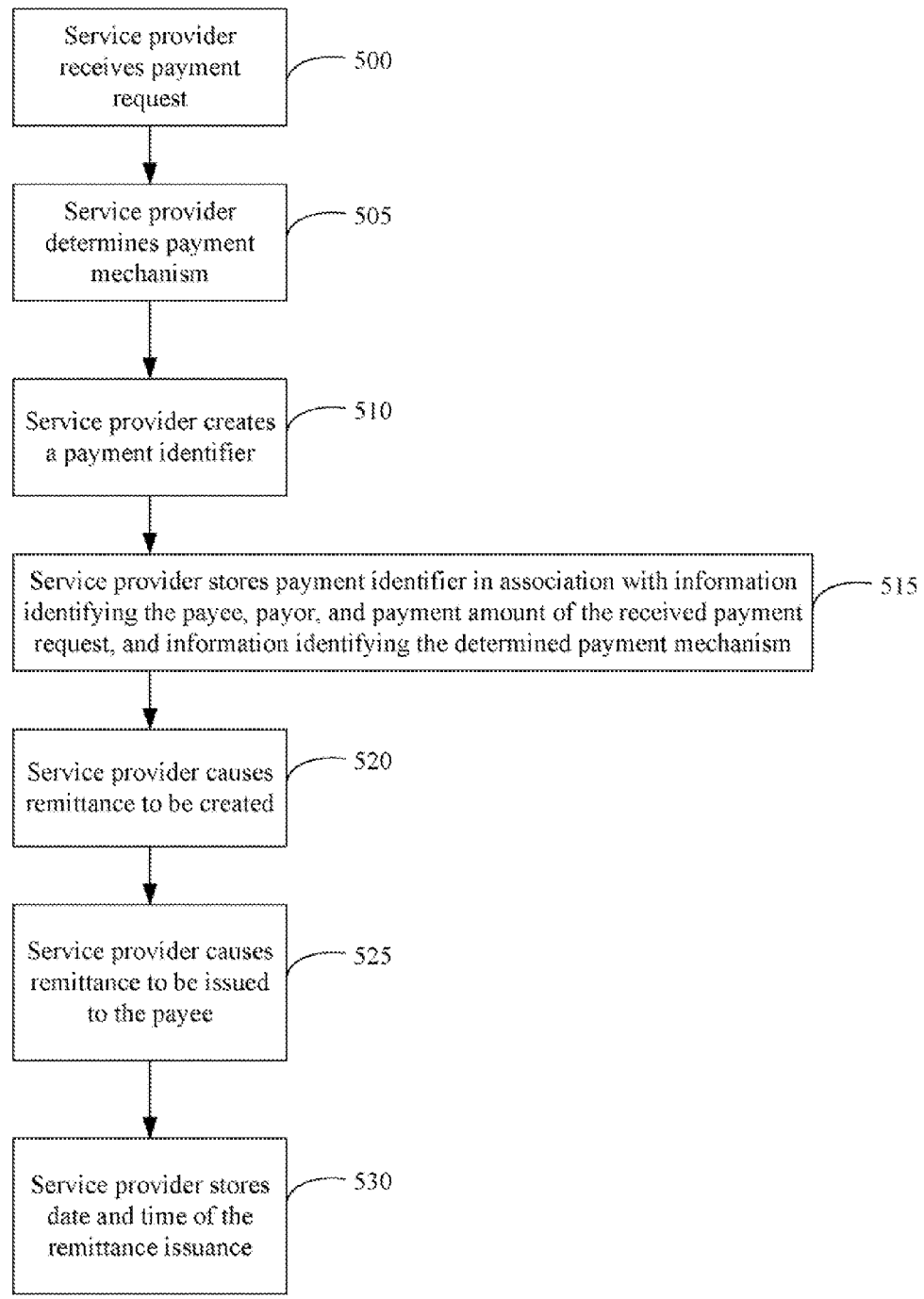
FIG. 5 is a simplified flow diagram of still other operations performed by the computing system of FIG. 3 in accordance with certain aspects of the present invention.

FIG. 5 is a simplified depiction of processing performed by the service provider 201 upon receiving a payment request from a subscriber 203A-203N. At step 500 a service provider communication interface 315 receives a payment request via the network 206 and passes the payment request on to a service provider processor 303. The payment request includes at least information identifying a subscriber, 203A-203N, information identifying a payee, which could be a managed payee 210A-210N, or an unmanaged payee 213A-213N, a payment amount, and a payment date, which could be a due date or a process date. At some point in time the processor 303 begins payment processing of the received payment request. This could be a batch process, or it could be a real-time process during a communication session with a subscriber 203A-203N.

At step 505, during payment processing, the processor 303 determines a payment mechanism to be utilized in completing the payment to the payee on behalf of the subscriber. As described above, selection of a payment mechanism is dependent upon whether the payee is a managed payee 210A-210N, or an unmanaged payee 213A-213N, and perhaps one or more other criteria, including evaluation of posting information and/or remittance center identification and risk processing.

The processor 303 creates a payment identifier associated with the received payment request at step 510. A payment identifier could be any one or more letters, digits, and/or symbols. Note that the payment identifier could alternatively, in some instances, be assigned prior to step 505.

At step 515 the processor 303 stores the created payment identifier in the payment history database 310A in association with at least information identifying the payor, information identifying the payee, information identifying the payment amount, and information identifying the determined payment mechanism. Note that these data elements need not all be stored together in one step, but could be incrementally inserted into the payment history database 310A in association with each other, as a function of processing flow.

The processor 303, at step 520, causes remittance in accordance with the selected payment mechanism to be created. This could, as appropriate, include the processor 303 creating an electronic funds transfer file for the ACH network, creating an electronic funds transfer file for a third party network, causing a corporate check to be printed, or causing a draft to be printed. The remittance advice portion of the remittance includes at least information identifying the payor and information identifying the payment amount, and preferably includes the payor's account number at the payee and the payment identifier. If the payment mechanism is a corporate check or a draft, the remittance advice is printed on the check or draft, or included therewith when delivered, otherwise the remittance advice is in electronic form.

At step 525 the processor 303 causes the remittance to be issued to the payee, in accordance with the selected payment mechanism. This could be solely via the ACH network, via the ACH network and another network, such as network 206, solely via another network, or via traditional postal delivery. At step 530 the processor 303 stores the date and optionally time of the issuance in the payment history database 310A in association with the assigned payment identifier.

Figure 6A:
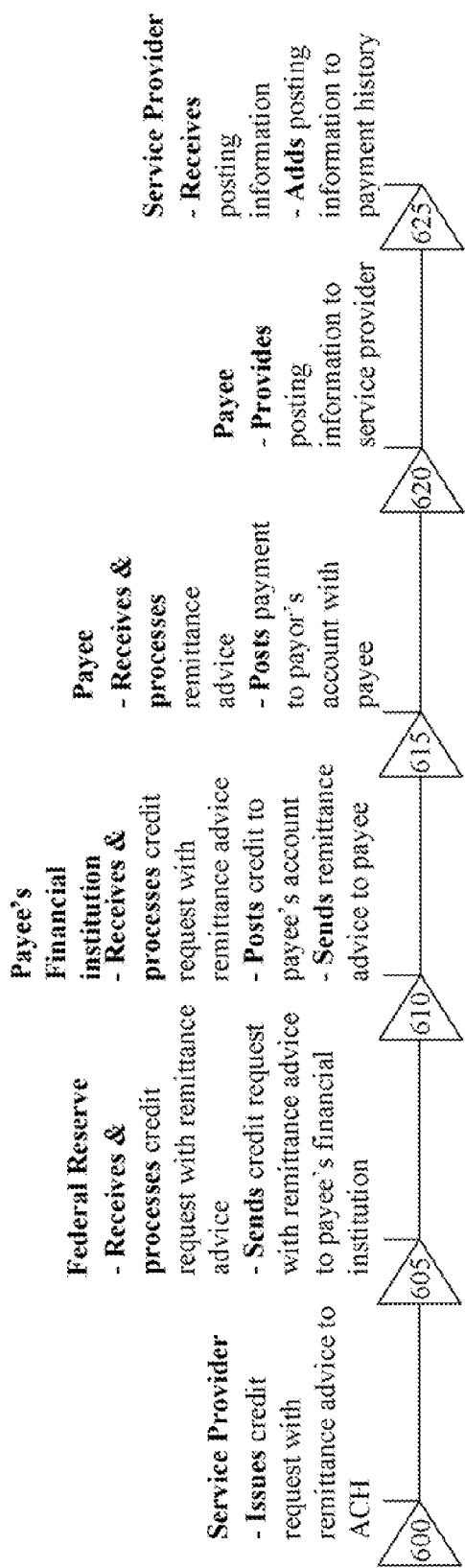
FIG. 6A depicts an ACH-ACH payment flow in accordance with certain aspects of the present invention.

FIG. 6A is a simplified depiction of the payment flow utilizing ACH-ACH payment to capture information utilized to estimate payment completion time. As with all electronic payments via the ACH network, or a third party network, the payee is a managed payee 210A-210N.

Figure 1A:
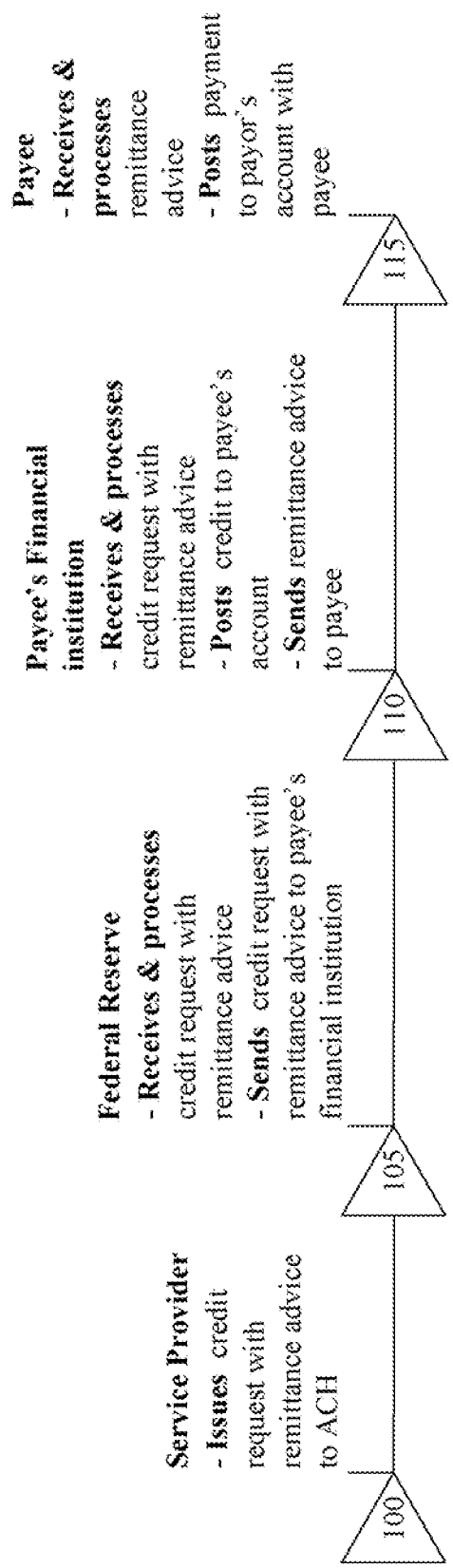
FIG. 1A depicts an ACH-ACH payment flow in the prior art.
Figure 1B:
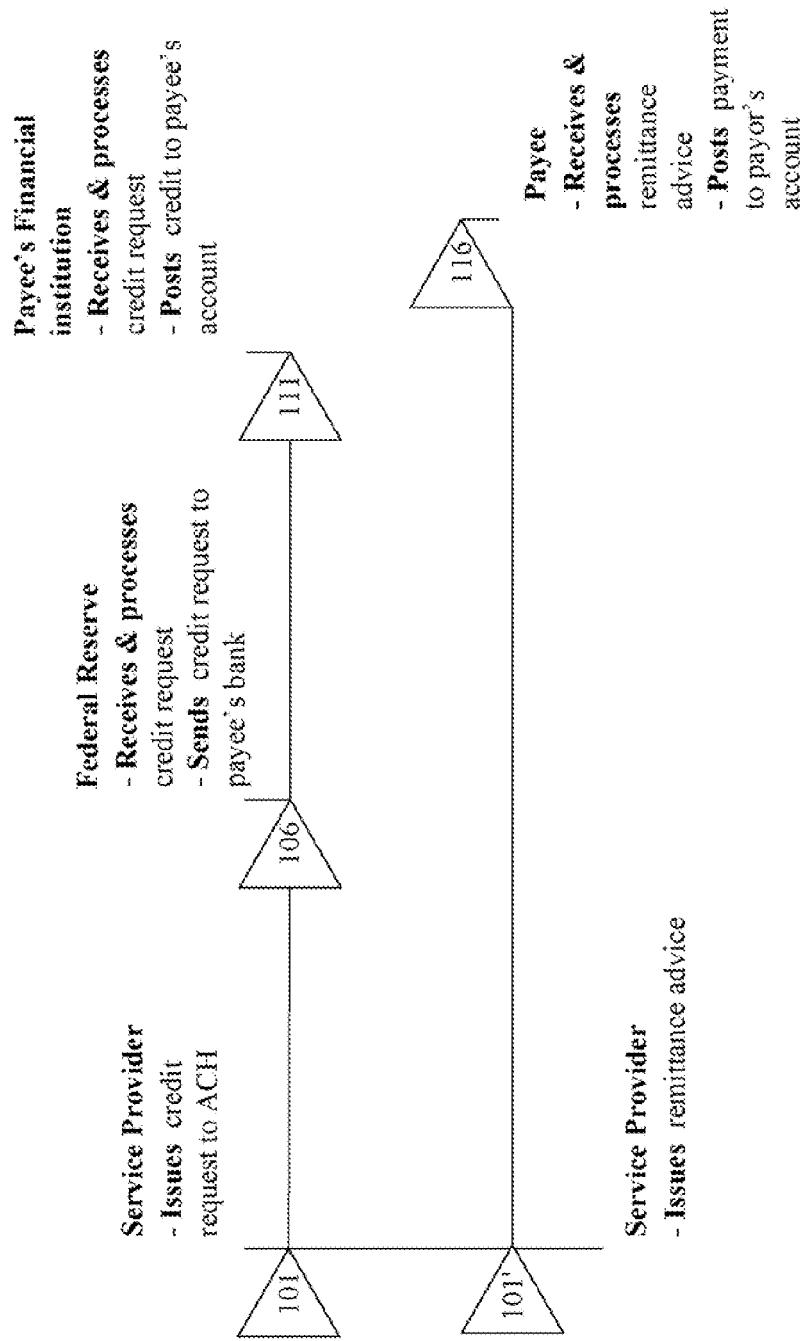
FIG. 1B depicts an ACH-direct send payment flow in the prior art.
Figure 1C:
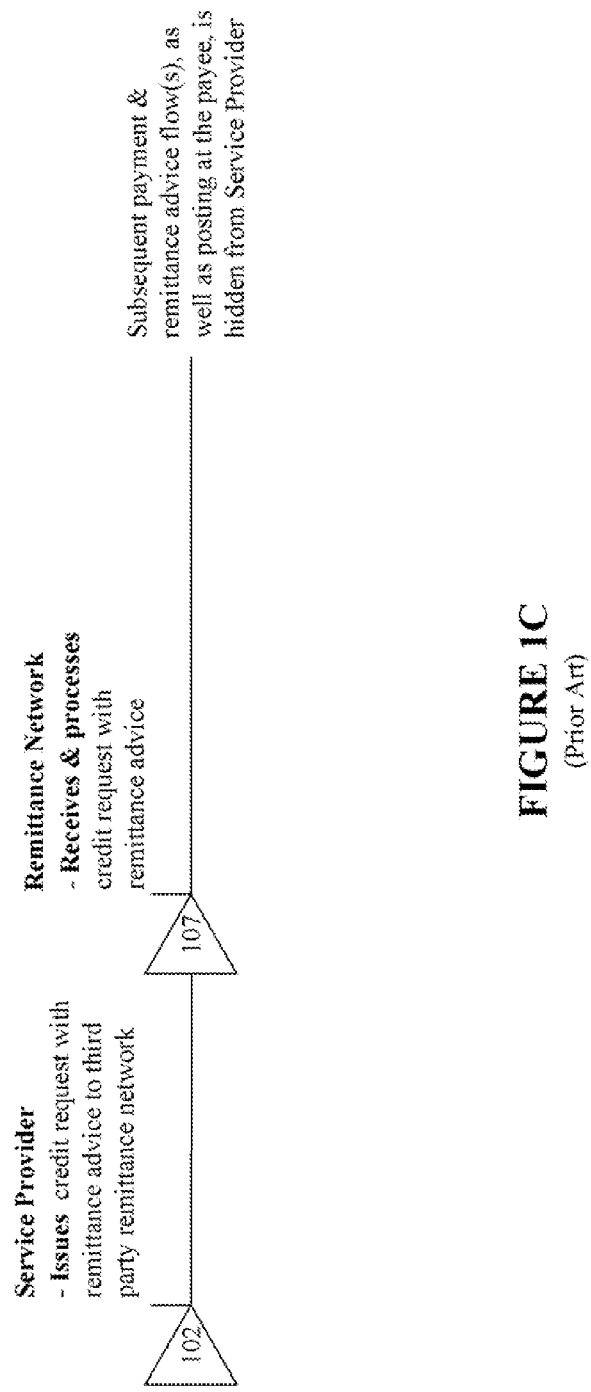
FIG. 1C depicts a third party payment/flow in the prior art.
Figure 1D:
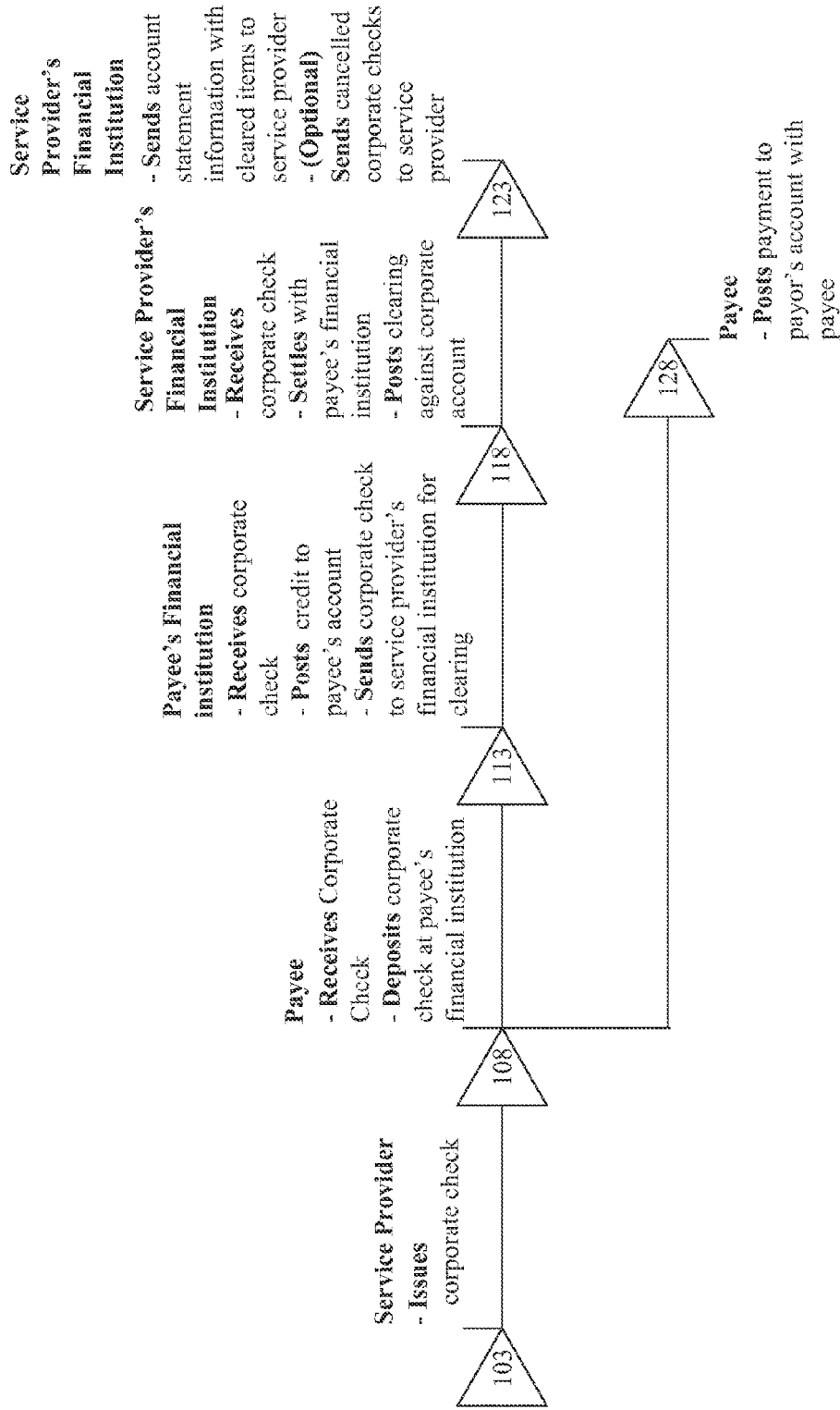
FIG. 1D depicts a corporate check payment flow in the prior art.
Figure 1E:
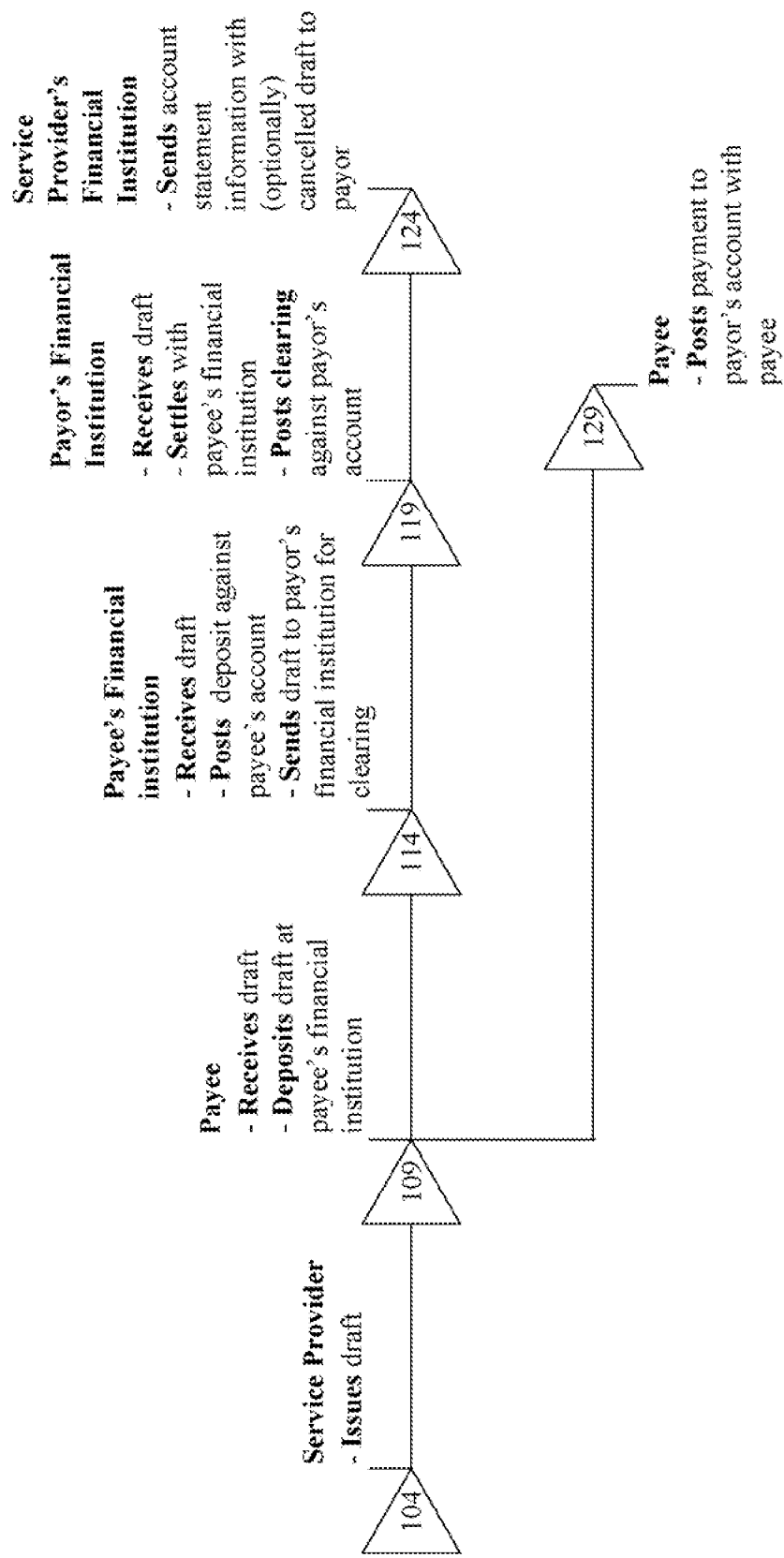
FIG. 1E depicts a draft payment flow in the prior art.

At step 600 a service provider processor 303 causes a communication interface 315 to transmit the electronic funds transfer file onto the ACH network, as described above and shown in FIG. 1A.

At step 605 the Federal Reserve receives the electronic funds transfer file and processes information included therein to identify the payee's financial institution. Via the ACH network, the credit request and remittance advice are then further transmitted to the payee's financial institution.

At step 610 the payee's financial institution receives the electronic funds transfer file. Upon receipt the payee's financial institution posts a credit in the amount of the payment to the payee's demand deposit account and sends the remittance advice to the payee.

The payee receives and processes the remittance advice in step 615. Processing the received remittance advice includes posting the payment to the payor's account with the payee.

Following, or concurrent with, posting the payment to the payor's account with the payee, at step 620, the payee provides posting information back to the service provider 201. This posting information includes information identifying the payment and/or payor and the date, and optionally the time, that the payment was posted to the payor's account with the payee. Preferably, the posting information is transmitted to the service provider 201 via the network 206. However, as desired, the posting information could be provided via another avenue, such as telephone, fax, email, or hard copy.

At step 625 the service provider 201 receives and processes the^ posting information. If the posting information is not received electronically, a human operator enters the received information into the system 300, then the processor 303 process the entered posting information. Preferably the posting information is received in electronic form, via the network 206, though it could be received electronically stored on a storage medium. No matter how received, the processor 303 reads the information identifying the payment and/or payor included in the posting information and accesses the payment history database 310A based upon the read information; The processor 303 stores the included posting date, and optionally the time, along with any other received posting information, in the payment history database 310A in association with the stored payment.

Figure 6B:
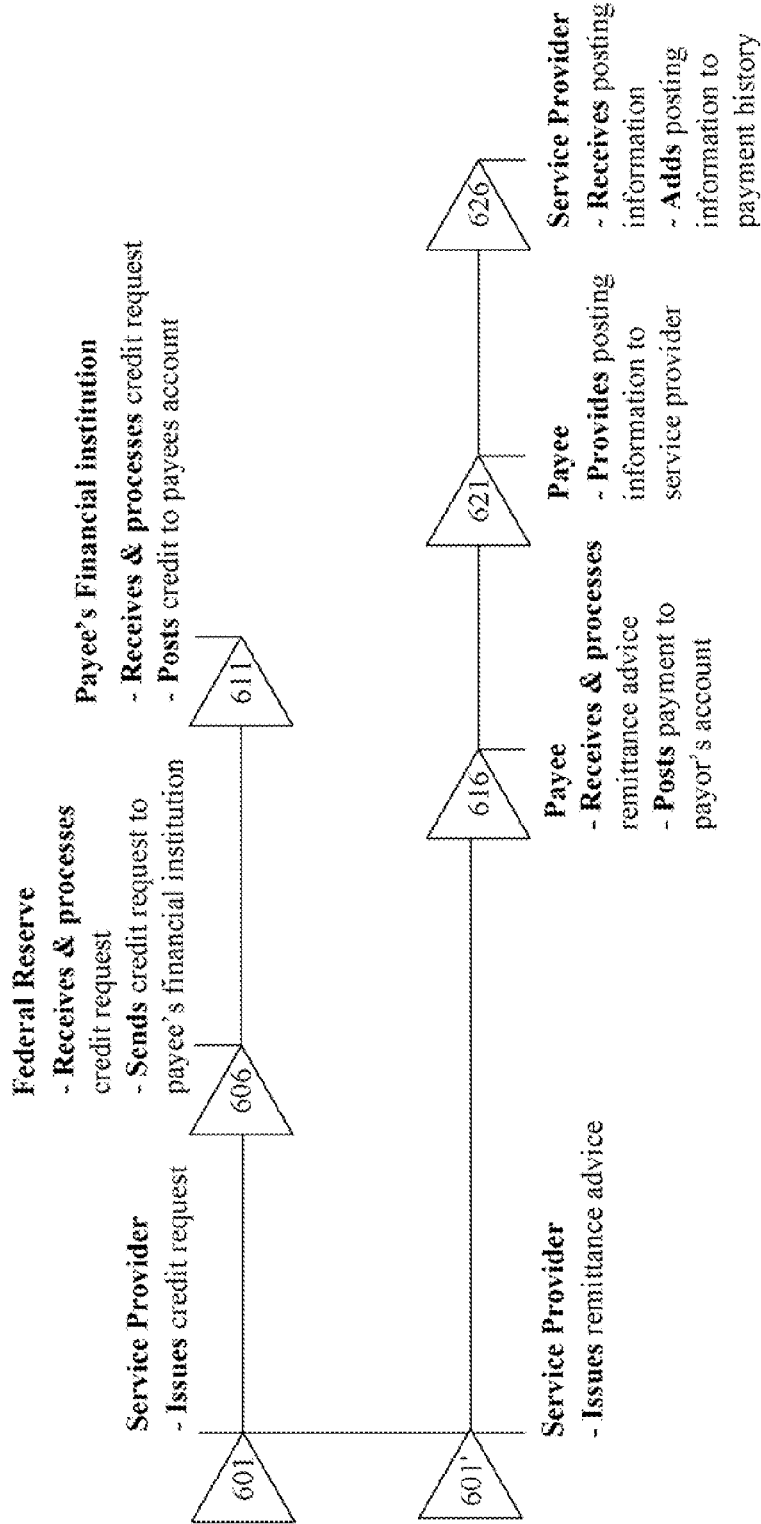
FIG. 6B depicts an ACH-direct send payment flow in accordance, with certain aspects of the present invention.

FIG. 6B is a simplified depiction of the payment flow utilizing ACH-Direct Send payment to capture information utilized to estimate payment completion time. At step 601 a service provider processor 303 causes a communication interface 315 to transmit the electronic funds transfer file, containing only a credit request, not remittance advice, onto the ACH network. At step 601', essentially concurrent with step 601, the service provider processor 303 causes a communication interface 315 to transmit remittance advice to the payee via the network 206.

At step 606 the Federal Reserve receives the electronic funds transfer file and processes information included therein to, identify the payee's financial institution. Via the ACH network, the credit request is then further transmitted to the payee's financial institution.

At step 611 the payee's financial institution receives the electronic funds transfer file. Upon receipt the payee's financial institution posts a credit in the amount of the payment to the payee's demand deposit account.

In step 616 the payee receives and processes the remittance advice. Processing the received remittance advice includes posting the payment to the payor's account with the payee.

Following, or concurrent with, posting the payment to the payor's account with the payee, at step 621, the payee provides posting information back to the service provider 201. As with ACH-ACH payment, this posting information includes information identifying the payment and/or payor and the date, and optionally time, that the payment was posted to the payor's account with the payee. Preferably, the posting information is transmitted to the service provider 201 via the network 206. However, as desired, the posting information could be provided via another avenue, such as telephone, fax, email, or hard copy.

At step 626 the service provider 201 receives and processes the posting information. If the positing information is not received electronically, a human operator enters the received information into the system 300 where the processor 303 processes the entered posting information. Preferably the posting information is received in electronic form, via the network 206, though it could be received electronically stored on a storage medium. No matter how received, the processor 303 reads the information identifying the payment and/or payor included in the posting information and accesses the payment history database 310A based upon the read information. The processor 303 stores the included posting date, and optionally the time, along with any other received posting information, in the payment history database 310A in association with the stored payment.

Figure 6C:
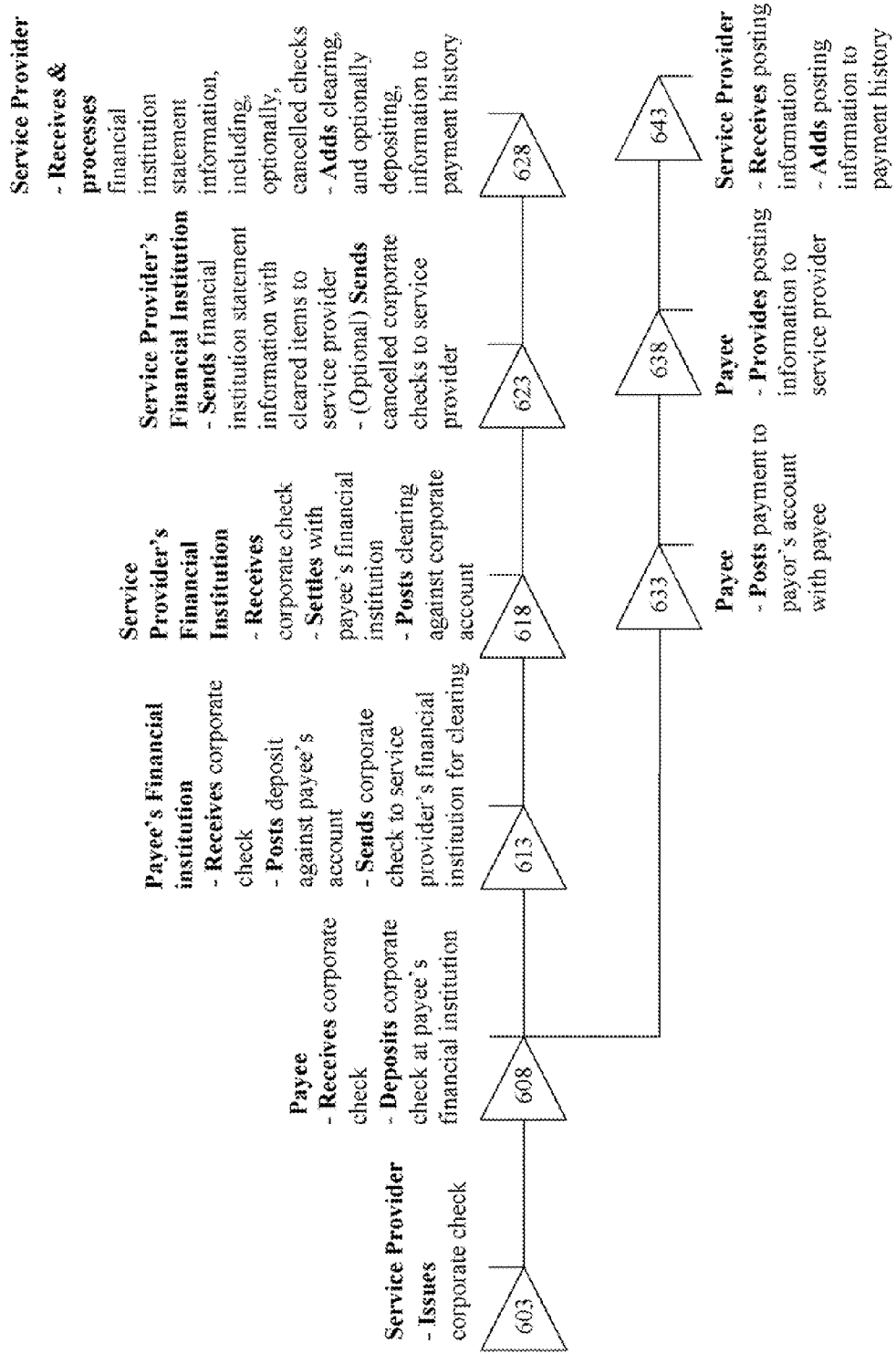
FIG. 6C depicts corporate check payment flow in accordance, with certain aspects of the present invention.

FIG. 6C is a simplified depiction of the payment flow, utilizing a corporate check, to capture information utilized to estimate payment completion time. At step 603 a service provider processor 303 causes a corporate check, having the remittance advice printed thereon, or associated therewith, to be delivered to the payee. The payee could be a managed payee 210A-210N or an unmanaged payee 213A-213N.

At step 608 the payee receives the corporate check and then deposits the same into a demand deposit account maintained at the payee's financial institution. The payee's financial institution receives the deposited check at step 613 and posts a credit in the amount of the payment to the payee's account. As discussed above, some financial institutions may print a time and date a check was deposited onto the deposited check. To actually receive funds, the payee's financial institution then sends the corporate check to the service provider's financial institution that maintains the service provider's demand deposit account.

At step 618 the service provider's financial institution receives the corporate check, settles with the payee's financial institution, and posts the corporate check against the service provider's demand deposit account (debiting the service provider's demand deposit account in the amount of the payment).

The service provider's financial institution, at step 623, sends a periodic account statement to the service provider reflecting the posted debit, including at least the date, if not also the time, of the debiting. As discussed above, some financial institutions deliver account statements in electronic form, and others deliver account statements in electronic form. Additionally, some deliver in both electronic and hard copy forms. Depending upon the financial institution, a hard copy account statement might also include the cancelled corporate check, or an image of the cancelled corporate check. An electronic account statement might also include an image of the cancelled corporate check.

At step 628 the service provider 201 receives the account statement from its financial institution, perhaps electronically and/or in hard copy, and processes the information included therein. If the account statement is received in hard copy, a human operator enters statement information, including clearing dates, and optionally times, of corporate checks into system 300. Also, if the service provider's financial institution provides cancelled checks, a human operator examines each cancelled check and determines if deposit date, and optionally time, information, and a payment identifier or other information identifying a payment and/or payor is printed thereon. If so, this information is also entered into system 300. Hard copy information, such as that in account statements, can, as desired, be scanned into system 300. If a statement is received electronically, it is passed onto the processor 303 for processing.

In processing account statement information, the processor 303 reconciles transactions reflected in the statement information/cancelled check information with information stored in the payment history database 310A. This includes the processor 303 matching each transaction involving a corporate cheek reflected in the account statement, as well as operator-entered information from cancelled checks, with the appropriate payment in the payment history database 310A. Once matched, the processor 303 then stores the clearing date, and optionally the time, for each corporate check transaction in the payment history database 310A in association with the appropriate stored payment. Also, the processor 303 stores the depositing date, and optionally the time, for each cancelled corporate check having such information printed thereon, in the payment history database 310A in association with the appropriate stored payment.

At some point subsequent to receipt of the corporate check, at step 633, the payee posts the payment amount to the payor's account with the payee. If the payee is a managed payee, following, or concurrent with, posting the payment to the payor's account with the payee, at step 638, the payee provides posting information back to the service provider 201. This posting information includes at information identifying the payment and/or payor and the date, and optionally time, that the payment was posted to the payor's account with the payee. Preferably, the positing information is transmitted to the service provider 201 via the network 206. However, as desired, the positing information could be provided via another avenue, such as telephone, fax, email, or hard copy.

At step 643 the service provider 201 receives and processes the posting information. If the positing information is not received electronically, a human operator enters the received information into the system 300, then the processor 303 processes the entered posting information. Preferably the posting information is received in electronic form, via the network 206, though it could be received electronically stored on a storage medium. No matter how received, the processor 303 reads the information identifying the payment and/or payor included in the posting information and accesses the payment history database 310A based upon the read information. The processor 303 stores the included posting date, and optionally the time, in addition to any other received posting information, in the payment history database 310A in association with the stored payment.

Figure 6D:
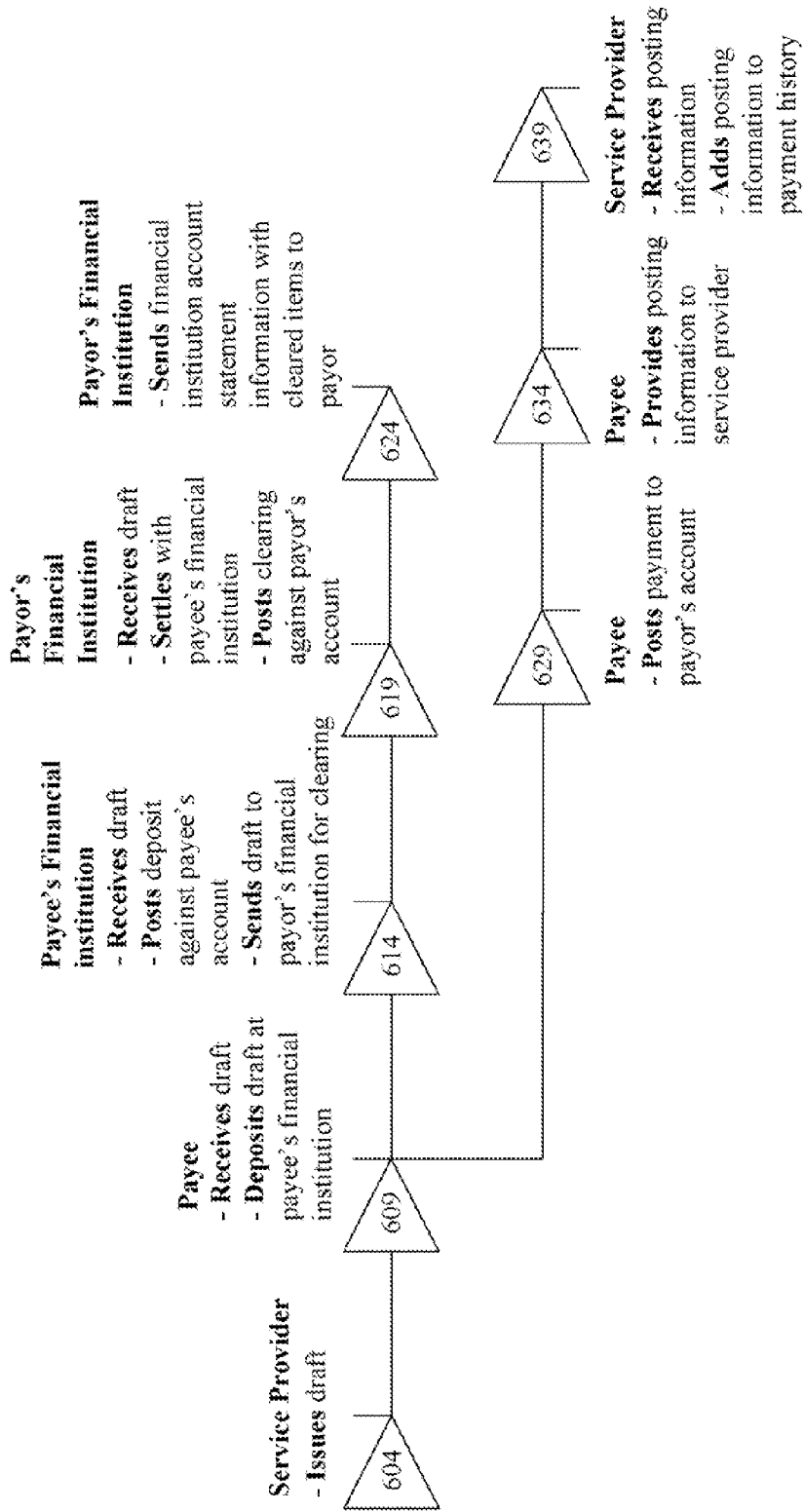
FIG. 6D depicts a draft payment flow in accordance, with certain aspects of the present invention.

FIG. 6D is a simplified depiction of the payment flow, utilizing a draft, to capture information utilized to estimate payment completion time if the payee is a managed payee 210A-210N. At step 604 a service provider processor 303 causes a draft, having the remittance advice printed thereon, or included therewith, to be delivered to the payee. The payee could be a managed payee 210A-210N or an unmanaged payee 213A-213N.

At step 609 the payee receives the draft and then deposits the same into a demand deposit account maintained at a financial institution. The payee's financial institution receives the deposited draft at step 614 and posts a credit in the amount of the payment to the payee's account. The payee's financial institution then sends the draft to the payor's financial institution for clearing.

At step 619 the payor's financial institution receives the draft and settles with the payor's payee's financial institution. The payor's financial, institution also posts the draft against the payor's demand deposit account. The payor's financial institution, at step 624, sends a periodic account statement to the payor reflecting the posted debit, similar to the discussion above for the corporate check.

At some point subsequent to receipt of the draft, at step 629, the payee posts the payment to the payor's account. If the payee is a managed payee 210A-210N, following, or concurrent with, posting the payment to the payor's account with the payee, at step 634, the payee provides posting information back to the service provider 201. This posting information includes information identifying the payment and/or payor and the date, and optionally time, that the payment was posted to the payor's account with the payee. Preferably, the positing information is transmitted to the service provider 201 via the network 206. However, as desired, the posting information could be provided via another avenue, such as telephone, fax, email, or hard copy.

At step 639 the service provider 201 receives and processes the posting information. If the posting information is not received electronically, a human operator enters the received information into the system 300, then the processor 303 processes the entered posting information. Preferably the posting information is received in electronic form, via the network 206, though it could be received electronically stored on a storage medium. No matter how received, the processor 303 reads the information identifying the payment and/or payor included in the posting information and accesses the payment history database 310A based upon the read information. The processor 303 stores the included posting date, and optionally the time, in addition to any other received posting information, in the payment history database 310A in association with the stored payment.

Figure 7:
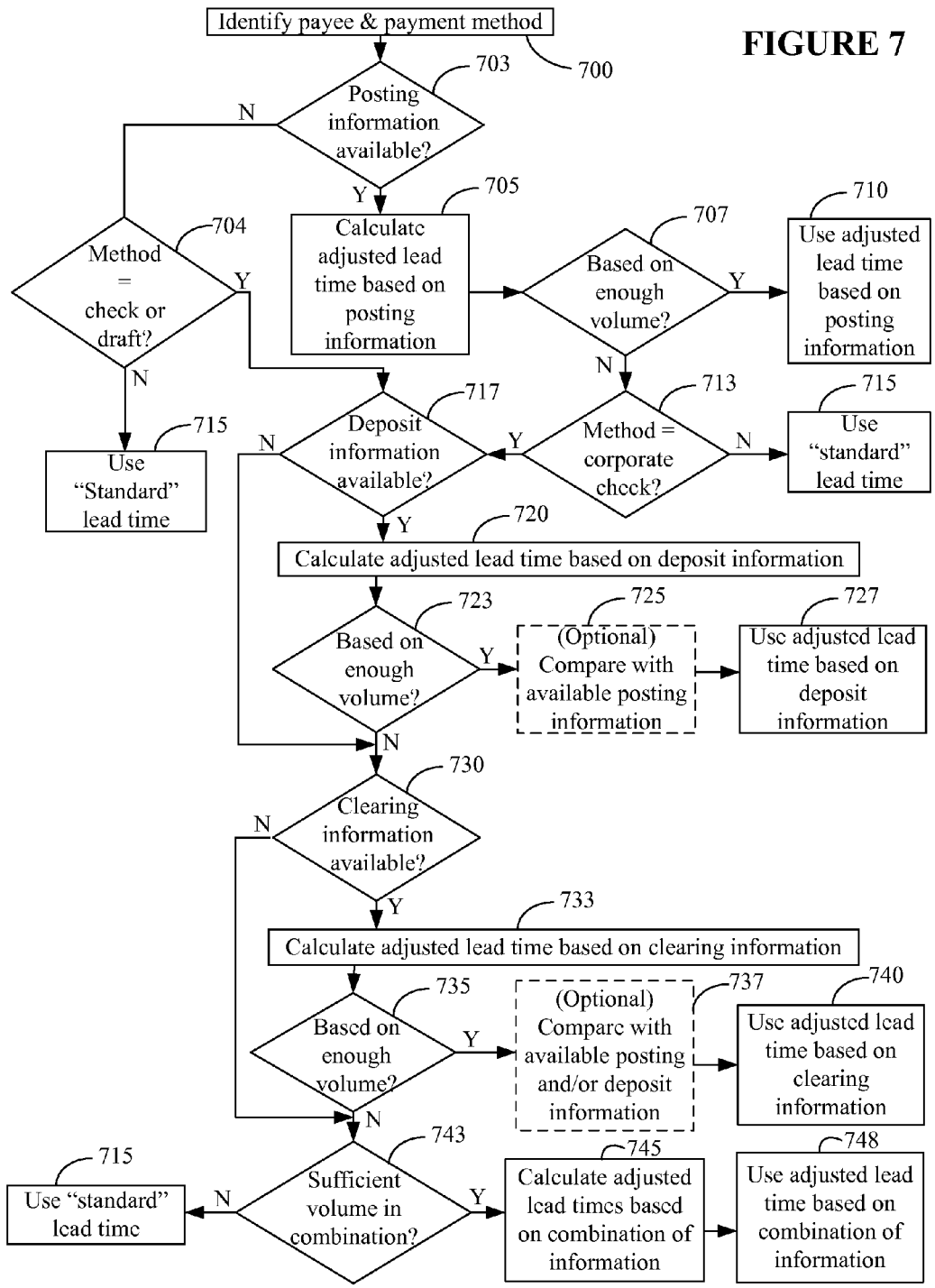
FIG. 7 is a simplified flow diagram of still other operations performed by the computing system of FIG. 3 in accordance with certain aspects of the present invention.

FIG. 7 is a simplified depiction of exemplary processing performed by the service provider 201 in determining an adjusted lead time based upon post-issuance event information stored in the payment history database 310A. The posting date, and optionally time, information is the most accurate of the post-issuance event information because, for any payment, the time difference between the date/time of remittance issuance and the date/time of payment posting is precisely the time that it takes for a payee to post that payment to a payor's account after the service provider 201 issues remittance.

Corporate check deposit date, and optionally time, information is the next most accurate of the post-issuance event information, followed by corporate check clearing date, and optionally time, information. The service provider 201 estimates a posting time when utilizing deposit and/or clearing information. This estimated posting time is more accurate than standard lead times because it is based upon one or more particular date/times of depositing and/or clearing of corporate checks associated with payments to a particular payee.

An adjusted lead time determined based upon one or more completed corporate check payments to a particular payee is applicable to a draft payment to that payee. A time between issuance of a draft and posting is the same as a time between issuance of a corporate check and posting, assuming the same physical delivery times. This is because a payee processes a corporate check and a draft in the same manner. That is, to a payee there is no difference between a corporate check and a draft.

As desired, the service provider 201 can calculate adjusted lead times in batch, or in real-time, payment processing during a communication session with a subscriber 203A-203N. If processed in batch, each calculated lead time is stored in association with information identifying the payee with which each lead time is associated. For managed payees 210A-210N, this is in the managed payee database 310B. For unmanaged payees 213A-213N, adjusted lead time information is stored in the subscriber profile database 310C in association with the payee in a subscriber's payee list. Preferably, if a particular unmanaged payee 213A-213N is a payee of multiple subscribers, an adjusted lead time for that unmanaged payee 213A-213N is stored in multiple locations in the subscriber profile database 310C. That is, the adjusted lead time is stored in association with the payee in all the payee lists in which that unmanaged payee 213A-213N appears.

Unmanaged payees 213A-213N are each associated with only one adjusted lead time, because an unmanaged payee 213A-213N can only be paid by corporate check or draft. As discussed above, an adjusted lead time determined based upon corporate check payments is applicable to payments made utilizing draft.

Any particular managed payee 210A-210N may be associated with one or more adjusted lead times. If a managed payee 210A-210N is not an electronic managed payee, that managed payee 210A-210N will be associated with a single adjusted lead time, based upon completed corporate check and/or draft payments. If a managed payee 210A-210N is an electronic managed payee, and if that payee is a payee that only receives payment according to a single electronic payment mechanism (ACH-ACH, or ACH-Direct Send, or Third Party), that payee will be associated with a single electronic adjusted lead time, based upon payments completed utilizing the single electronic payment mechanism. An electronic managed payee 210A-210N could be a payee that only receives payment according to a single electronic payment mechanism for any one several reasons, including that a particular payee will only accept one form of payment, that no risk-processing will be performed on payments directed to that particular payee, or perhaps all payees, or that no account-scheming will be performed on payments directed to that particular payee, or perhaps all payees.

If a managed payee 210A-210N is an electronic payee that accepts payment according to multiple electronic payment mechanisms, that payee will be associated with multiple electronic adjusted lead times, each associated with a particular payment mechanism. Also, if a managed payee 210A-210N is an electronic payee to which a payment could be made according to either one or more electronic payment mechanisms, or by corporate check or draft, that payee will be associated with multiple adjusted lead times. Of course, other scenarios resulting in a managed payee 210A-210N being associated with multiple adjusted lead times is within the scope of the present invention.

In real-time payment processing the service provider 201 determines a payment mechanism to be utilized in fulfilling the payment request, then determines the adjusted lead time for the determined payment mechanism. Determination of a payment mechanism is first dependent upon a payee's status as a managed payee 210A-210N or an unmanaged payee 213A-213N. If a payee is an unmanaged payee, 213A-213N, the payment will necessarily be by either check or draft, which are associated with a same adjusted lead time. Thus, the service provider 201 first determines if a payee is an unmanaged payee 213A-213N in determining a payment mechanism.

If the payee is a managed payee 210A-210N, the service provider 201 next determines if the payee is an electronic payee. If not, the payment will also be either by check or draft, which are each associated with a same adjusted lead time. If the payee is an electronic payee, the service provider's further processing capabilities and the available options (including payee preferences) are used together to determine a payment mechanism. If the service provider 201 does not perform this further processing, the payment mechanism will be in accordance with the payee-preferred payment mechanism.

The operations depicted in FIG. 7 could be performed in batch, or in real-time. At step 700 a service provider processor 303 identifies a payee and a payment mechanism. At step 703 the processor 303 accesses the payment history database 310A and determines if any included payment, of the identified payment mechanism and to the identified payee, includes posting information. As desired, only payments falling within a predetermined time frame are identified. Also as desired, only payments made on behalf of one or more" particular subscribers 203A-203N are identified.

As should be understood from the discussion above, posting information associated with managed payees 210A-210N that provide posting information to the service provider 201 will be the most common posting information in the payment history database 310A. However, posting information gathered from a payee (managed or unmanaged) during claim resolution might also exist in the payment history database, 310A. If posting information is not available in the payment history database 310A, operations continue with step 704.

In step 704 the processor 303 determines if the identified payment mechanism is corporate check or draft. If so, operations continue with step 717. If not, operations continue with step 715, to be discussed below.

If posting information is available, as determined at step 703, the processor 303, at step 705, calculates an adjusted lead time based upon the included posting information of each identified payment. In calculating the adjusted lead time the processor 303 determines a time difference between a payment issuance time, stored in the payment history database 310A, and the associated posting time for each identified payment. Then, the processor 303 determines an average posting time by dividing the sum of these time differences by the number of identified payments. This average posting can become the basis for an adjusted lead time.

At step 707 the processor determines if the average posting time is based upon a sufficient number of identified payments: It should be noted that step 707 could, as desired, immediately precede step 705, and thus make execution of step 705 unnecessary. This sufficient number could, as desired, be a number utilized in determining all adjusted lead times, or could vary dependent upon any one, or more, of payee identity, payor identity, payment mechanism, and source of posting information. If not, operations continue with step 713. If so, operations continue with step 710 in which the processor 303 uses the determined adjusted lead time in further processing.

At step 713 the processor 303 determines if the identified payment mechanism is one of a corporate check or a draft. If not, operations continue with step 715. At step 715 the processor 303 selects a standard lead time for the identified payment mechanism, which will be electronic. A standard lead time is utilized because deposit and/or clearing information stored in the payment history database 310A is not useful in determining an adjusted lead time for electronic payments.

If at step 713 it is decided that the payment mechanism is corporate check or draft, operations continue with step 717 in which the processor 303 accesses the payment history database 310A and determines if any included corporate check or draft payment, to the identified payee, includes deposit information. As desired, only payments falling within a predetermined time frame are identified. Also as desired, only payments made on behalf of one or more particular subscribers 203A-203N are identified. If not, operations continue with step 730.

If deposit information is available, at step 720 the processor 303 calculates an adjusted lead time based upon the included deposit information of each identified payment. Calculating an adjusted lead time based upon deposit information includes the processor 303 first determining a time difference between payment issuance time and depositing time for each identified payment. Then, the processor 303 determines an average depositing time of the identified payments. The processor 303 then adds an estimated posting period to the average depositing time to arrive at an estimated posting time. An estimated posting period can, as desired, be a standard period. Also, an estimated posting period can, as desired, vary by payee. It should be noted that an estimated posting period could be a positive time period, a negative time period, or a null time period.

At step 723 the processor 303 determines if the estimated posting time is based upon a sufficient number of identified payments. It should be noted that step 723 could, as desired, precede step 720. This sufficient number could, as desired, be a number utilized in determining all adjusted lead times, or could vary dependent upon any one, or more, of payee identity, payor identity, payment mechanism, and source of deposit information. If not, operations continue with step 730.

If so, operations continue with optional step 725 in which the processor 303 optionally compares the average posting time based: upon posting information with the estimated posting time based upon deposit information. If optional step 725 is performed, the processor 303 applies any one of multiple rules, as desired, to determine which of the two determined values (average and estimated posting times) will be utilized. A first rule is that if the two values are within a predetermined difference of each other, the value based on the larger volume of payment data is utilized. A second rule is that if the two values are within a predetermined difference of each other, the larger value is utilized. A third rule is that if the two values are within a predetermined difference of each other, an average of the two values is utilized. As desired, in averaging, the two values can be weighted in relation to the volume of payment data upon which each is based. Other rules to select a value to utilize are within the scope of the present invention.

At step 727 the processor 303, uses a calculated posting time (average, estimated, or combination) as an adjusted lead time in further processing. At step 730 the processor 303 accesses the payment history database 310A and determines if any included corporate check or draft payment, to the identified payee, includes clearing information. As desired, only payments falling within a predetermined time frame are identified. Also as desired, only payments made on behalf of one or more particular subscribers 203A-203N are identified. If not, operations continue with step 743.

If clearing information is available, at step 733 the processor 303 calculates an adjusted lead time based upon the included clearing information of each identified payment. Calculating an adjusted lead time based upon clearing information includes the processor 303 first determining a time difference between payment issuance time and clearing time for each identified payment. Then, the processor 303 determines an average clearing time of the identified payments. The processor 303 then adds an estimated posting period to the average clearing time to arrive at an estimated posting time. An estimated posting period can, as desired, be a standard period. Also, an estimated posting period can, as desired, vary by payee and vary according to whether it is being combined with an average depositing time, or an average clearing time. It should be noted that an estimated posting period could be, as desired, a positive time period, a negative time period, or a null time period.

At step 735 the processor 303 determines if the estimated posting time is based upon a sufficient number of identified payments. It should be noted that step 735 could, as desired, precede step 733. This sufficient number could, as desired, be a number utilized in determining all adjusted lead times, or could vary dependent upon any one, or more, of payee identity, payor identity, payment mechanism, and source of clearing information. If not, operations continue with step 743, described below.

If so, operations continue with optional step 737 in which the processor 303 optionally compares the estimated posting time based upon clearing information with at least one of the average posting time based upon posting information and the estimated posting time based upon deposit information. If optional step 737 is performed, the processor 303 applies any one of multiple rules, as desired, to determine which of the three determined values (posting times) will be utilized. A first rule is that if the value based upon clearing information and either or both the value based upon deposit information and the value based on posting information are within predetermined difference, the value based on the larger volume of payment data is utilized. A second rule is that if the value based upon clearing information and either or both the other values are within a predetermined difference, the largest value is utilized. A third rule is that if the value based upon clearing information and either or both the other values are within a predetermined difference, an average of values within the predetermined difference is utilized. As desired, in averaging, the two, or three, values can be weighted in relation to the volume of payment data upon which each is based. Other rules to select a value to utilize are within the scope of the present invention.

At step 740 the processor 303, uses a calculated posting time as an adjusted lead time in further processing. At step 743 the processor 303 determines if there is sufficient volume in combination. That is, the processor 303 determines if a combination of at least two of posting information, deposit information, and clearing information is available. This sufficient volume could, as desired, be a number utilized in determining all adjusted lead times, or could vary dependent upon any one, or more, of payee identity, payor identity, and payment mechanism. If not, operations continue with step 715, discussed above.

If a sufficient volume exists in combination, at step 745 the processor 303 calculates an adjusted lead time based upon any included posting, deposit, and/or clearing information of each identified payment. That is, individual averages, per each available information type, are calculated. Operations continue with step 748 in which the processor 303 either uses the adjusted lead time calculated based upon combination information in further processing, if the calculated averages are within an acceptable threshold, determined by the service provider 201, of one another, or the processor 303 utilizes the highest value.

Delivery of Payment Posting Information to Subscribers

The service provider 201 utilizes the posting information received from a managed payee 210A-210N for other purposes besides calculating adjusted lead times. The service provider 201 presents at least a portion of received posting information to the subscriber 203A-203N on whose behalf the service provider 201 made the payment with which the received posting information is associated.

As desired, posting information is either pushed to a subscriber 203A-203N by the service provider 201, or pulled by a subscriber 203A-203N from the service provider data repository 310. Similar to the notification of a projected payment being due, the service provider 201, as desired, may push posting information via email, or via a PC application-based interface.

For those situations in which posting information is pushed via email, a service provider processor 303 accesses the payment history database 310A and retrieves at least a portion of received posting information associated with a payment made by the service provider 201 on behalf of a subscriber 203A-203N, constructs, an email message notification of the posting, and causes a communication interface 315 to transmit the constructed message to the subscriber 203A-203N. The retrieved posting information includes, in this aspect of the present invention, at least information identifying the payee, the payment amount, and the date, and optionally time, the payee posted the payment to the subscriber's account with the payee.

For those situations in which posting information is pushed, in-application, the service provider processor 303 accesses the payment history database 310A to retrieve posting information and constructs an in-application notification of the posting. The retrieved information includes, in this aspect of the present invention, at least information identifying the payee, the payment amount, and the date, and optionally time, the payee posted the payment to the subscriber's account with the payee. The constructed notification is stored in the data repository 310 until the subscriber 203A-203N to whom the notification is directed accesses the service provider system 300. At some point during a communication session the processor 303 causes a communication interface 315 to transmit the stored notification to the subscriber 203A-203N without the subscriber 203A-203N requesting the notification.

As desired, posting information is also available to subscribers 203A-203N through a payment history presentation. In such instances the information is pulled rather than pushed. Introduced above, a payment history presentation is based upon the contents of the payment history database 310A. Whenever a subscriber 203A-203N requests to view his or her payment history a service provider processor 303 accesses the payment history database 310A and identifies payments in which that subscriber 203A-203N is the payor. The processor 303 retrieves Information stored in the payment history database 310A associated with each of these payments and constructs a payment history presentation. The retrieved information includes, in this aspect of the present invention, at least information identifying the payee, the payment amount, and the date, and optionally time, the payee posted the payment to the subscriber's account with the payee. The processor 303 causes a communication interface 315 to transmit the constructed payment history presentation to the subscriber 203A-203N, preferably via the network 206, upon the subscriber 203A-203N requesting to view his or her payment history.

Proactive Claim Resolution

The payment history database 310A includes the date and optionally time that the service provider 201 issues remittance for each payment, as discussed above. The payment history database 310A also includes, for those payments made to managed payees 210A-210N that provide posting information, the date, and optionally time, that a payee posts a payment, also as discussed above. Further, for corporate check payments, the payment history database 310A also includes the date, and optionally time, that a corporate check is cleared, in addition to perhaps the date, and optionally time, that a corporate check is deposited, also as discussed above. The service provider 201 utilizes this information to proactively determine that a payee has not posted, or has not correctly posted, a payment issued by the service provider 201.

Periodically, such as in a daily batch routine, a service provider processor 303 accesses the payment history database 310A and identifies the entries included therein, associated with managed payees 210A-210N that provide posting information and those that do not include posting information. For those identified entries, the processor 303 determines if an expected time of receipt of posting information has passed. This determination is based upon a time difference between remittance issuance and the current date. If the time since remittance issuance of an identified payment is greater than a threshold value, the processor 303 stores an indication in a proactive payment resolution queue for claim resolution.

Claim resolution personnel, based upon queue contents, contact the appropriate managed payee 210A-210N and determine if that payee is having difficulty posting the payment. If so, a claim is resolved before that payee, or the subscriber 203A-203N on whose behalf the payment was made, contacts the service provider 201.

Beneficially, for corporate check payments to those payees that do not provide posting information, the service provider 201 also proactively resolves claims. Periodically, such as daily, a service provider processor 303 accesses the payment history database 310A and identifies those corporate check payments that have not cleared. For those identified corporate check payments, the processor 303 determines if an expected clearing date has passed. An expected clearing date could be, as desired, based upon a standard time difference between corporate check issuance and clearing for any corporate check payment. Or, an expected clearing date could be based upon a payee-specific time difference between corporate check issuance and clearing. That is, the processor 303 determines an average time difference between corporate check issuance and clearing for each corporate check payment to a particular payee. If an expected clearing date has passed, the processor 303 adds the payment to the proactive payment resolution queue for claim resolution.

Again, claim resolution personnel, based upon queue contents, contact the appropriate payee and determine if that payee is having difficulty posting the payment, or has even received the corporate check. If a claim issue exists, the claim is resolved before that payee, or the subscriber 203A-203N on whose behalf the payment was made, contacts the service provider 201.

If a payee posts a payment to an incorrect payor account with the payee, this may be reflected in the posting information received by the service provider 201. Before received posting information is stored in the payment history database 310A, a service provider processor 303 attempts to ensure that the payee correctly posted the payment. That is, the processor 303 compares information included in the received posting information with information stored in the payment history database 310A, such as payor identifying information, payee identifying information, and/or payment amount, to ensure that the information matches. If the information doesn't match, the processor 303 does not store the information in the payment history database 310A. Rather, the payment is added to the proactive payment resolution queue for claim resolution. Thereafter, as discussed above, service provider personnel contact the payee and aid the payee in correctly posting the payment.

Improved Information Flow to Payee

Early Payment Information

In this aspect of the present invention the service provider 201 transmits an early payment information file to a managed payee 210A-210N. An early payment information file is associated with a set of one or more payments to be made by the service provider 201 on behalf of one or more subscribers 203A-203N. An early payment information file contains at least information identifying a payor (one of subscribers 203A-203N) and information associated with a payment to be completed on behalf of the payor. The information associated with a payment could include, but is not limited to: a payment identifier, a payment amount, a requested payment date, an expected payment issuance date, an expected payment mechanism, or a status change. As will be discussed below, other information, as desired, can be included in an early payment information file. In any event, an early payment information file includes at least the information necessary for a payee to perform certain functions, such as ensure continued service in the event of late payment, accurately forecast cash flow, or better manage a customer relationship. Note that this payment information file, although similar in content to remittance advice, does not cause the payee to post a payment to a payor's account with the payee, as remittance advice does.

Improved information flow to a payee benefits both a subscriber 203A-203N and a managed payee 210A-210N. Some examples of how a managed payee 210A-210N can utilize the information were cited above. A subscriber 203A-203N is benefited by avoidance of the negative consequences of late payment or more personalized customer relationship management from the payee.

Figure 8A:
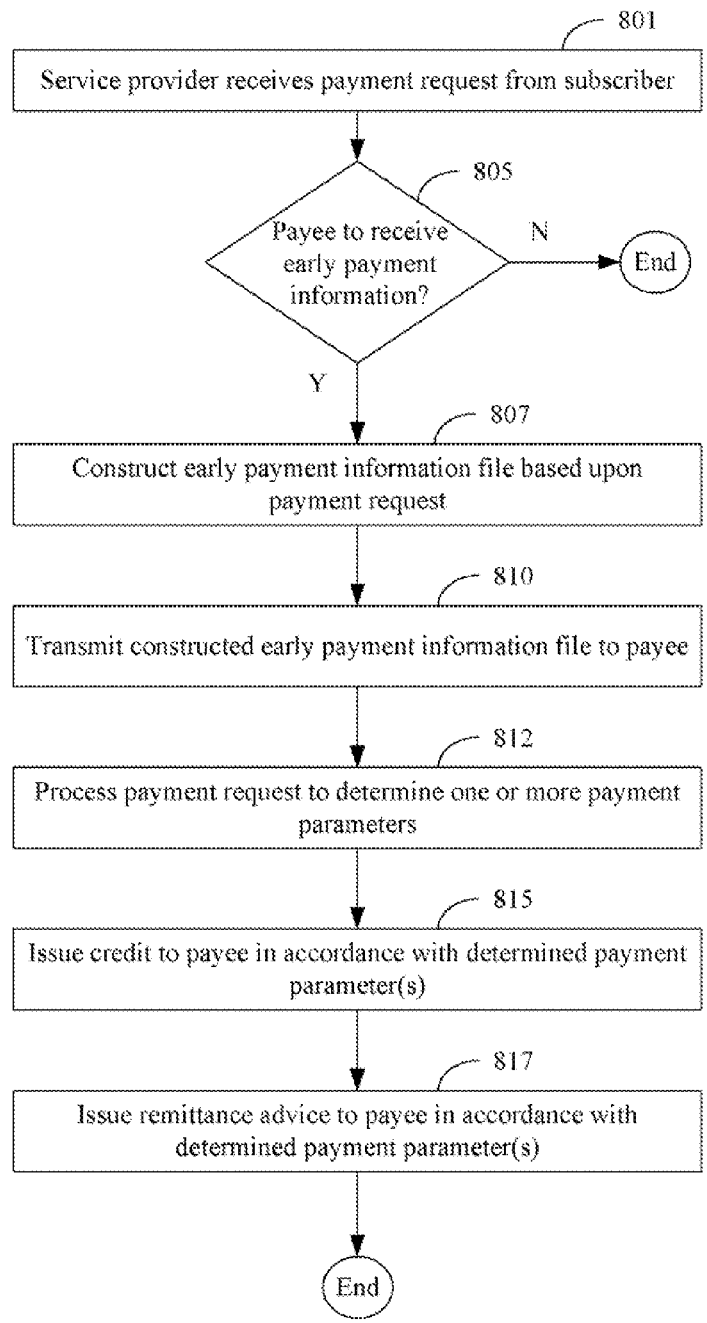
FIG. 8A is a simplified flow diagram of other operations performed by the computing system of FIG. 3 in accordance with certain aspects of the present invention.

FIG. 8A is a simplified flow diagram of first alternative operations of this aspect of the present invention. In the first alternative the transmission of the early payment information file is not dependent upon payment processing. At step 801 the service provider 201 receives a payment request from a subscriber 203A-203N via the network 206. The payment request includes at least information identifying a payee, a subscriber 203A-203N (a payor), and a payment amount.

At step 805 a service provider processor 303 determines if early payment information will be transmitted to the payee identified in the received payment request. This includes at least accessing a listing of managed payees 210A-210N that can be reached electronically and determining if the payee identified in the received payment request is included in this listing. It can, as desired, further include, if the payee is an electronic managed payee 210A-210N, determining if the payee desires to receive early payment information. It can also, as desired, include determining if the payor has indicated a desire, in the payment request or otherwise, for the payee to receive early payment information. If the payee is not to receive early payment information, for whatever reasons, operations end. If it is determined that the payee will receive early payment information, operations continue with step 807.

At step 807 the service provider processor 303 extracts at least a portion of the information included in the received payment request, including at least the payment amount and the payor's identity, and constructs an early payment information file indicating that a payment in the identified amount for the identified payor is forthcoming. Preferably, a supplied or implied payment date is also included. The service provider processor 303 then causes, at step 810, a service provider communication interface 315 to transmit the constructed early payment information file to the payee via the network 206. Thus, in this alternative, prior to any processing of the payment request to complete payment to the payee on behalf of the payor, the service provider provides payment information to the payee. Any early payment information file can, as desired, be transmitted via a real-time synchronous communication, or an asynchronous communication. If transmitted via a synchronous communication, an early payment information file could, as desired, additionally be transmitted during a communication session between the service provider 201 and the payor. If transmitted via an asynchronous communication, an early posting file could be transmitted in batch, via email, or by message queuing, as desired. Further, any early payment information file can, as desired, include information associated with a plurality of payment requests, each requesting the service provider 201 to pay the payee on behalf of a payor.

At step 812 the service provider processor 303 processes the payment request to determine one or more parameters associated with the payment to be made to the payee on behalf of the payor. These parameters can include, but are not limited to, a form of payment, and a time payment will be issued, in addition to any other information produced as a result of any payment processing discussion herein. At step 815 the service provider processor 303 causes a credit to be issued to the payee in accordance with the determined payment parameters. At step 817 the service provider processor 303 causes remittance advice to be issued to the payee in accordance with the determined payment parameters. This remittance advice can include any information typically included in remittance information, including any information included in the previously transmitted early payment information file. As will be understood from the discussion above, the remittance advice and the credit may, dependent upon payment processing, be issued at the same time, or in a different order than that depicted in FIG. 8A. Further, as also will be understood from the discussion above, one or both of the remittance advice and the credit may, dependent upon payment processing, be electronic, or be paper.

Figure 8B:
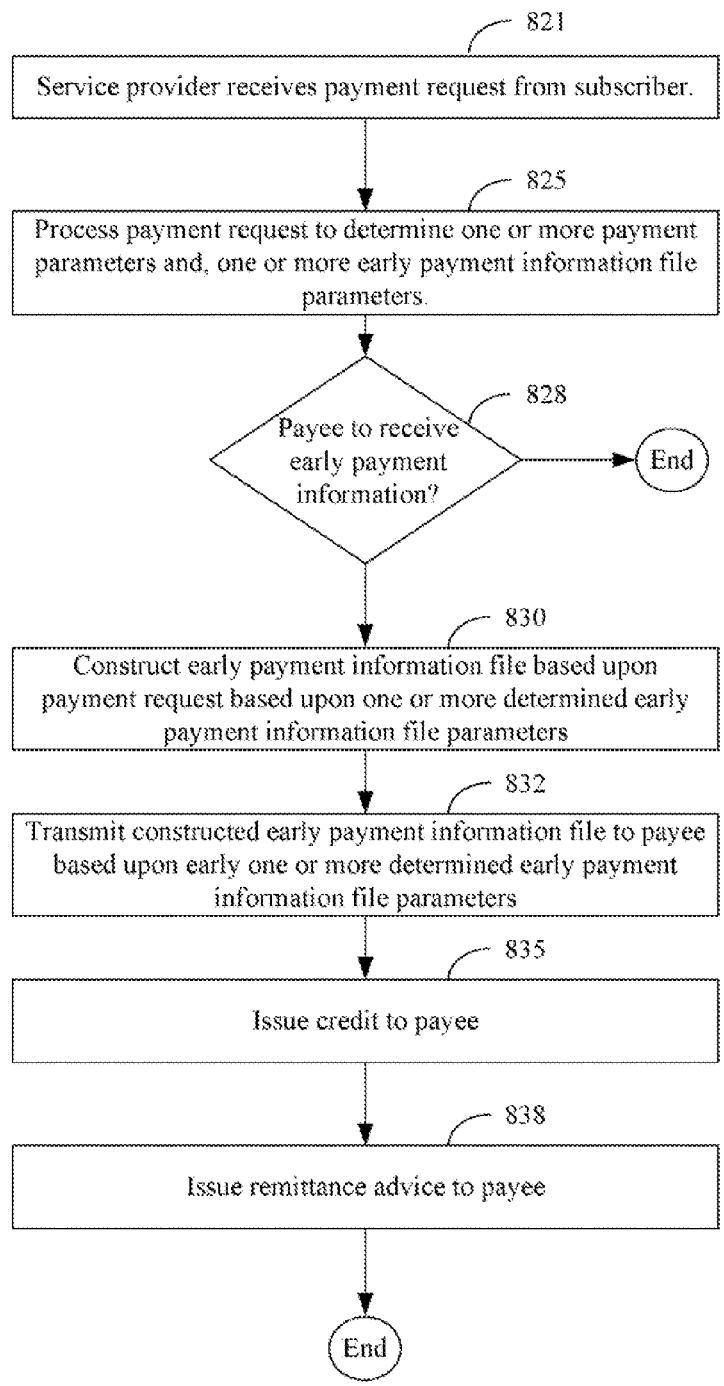
FIG. 8B is a simplified flow diagram of still other operations performed by the computing system of FIG. 3 in accordance with certain aspects of the present invention.

FIG. 8B is a simplified flow diagram of second alternative operations of this aspect of the present invention. In the second alternative operations, the early payment information file transmitted to the payee via the network 206 is constructed and/or transmitted in accordance with payment processing performed on a received payment request. At step 821 the service provider 201 receives a payment request from a subscriber 203A-203N via the network 206. As in the first alternative, the payment request includes at least information identifying a payee, a subscriber 203A-203N (a payor), and a payment amount.

At step 825 the service provider processor 303 accesses at least one of the Managed Payee Database 310B and the Subscriber Profile Database 310C to determine one or more early payment information file parameters associated with the payee or payor, respectively. These early payment information file parameters can include, but are not limited to, whether an early payment information file will be transmitted to the payee, a time the early payment information file will be transmitted to the payee, and the contents of the early payment information file. The service provider processor 303 also processes the payment request or other data associated with the payment request to determine one or more payment parameters.

At step 828 the service provider processor 303 determines if the payee included in the payment request is to receive early payment information based upon the payment processing. If the payee is not to receive early payment information, operations end. If it is determined that the payee will receive early payment information, operations continue with step 830.

At step 830 the service provider processor 303 constructs an early payment information file in accordance with the payment processing and retrieved parameters associated with the early payment information file. That is, the constructed early payment information file includes information identifying the payment and/or payor, and perhaps other information, as dictated by the payment processing. This other information can include, but is not limited to, information identifying a determined payment mechanism (form of payment), information identifying a determined payment issuance date, an indication as to whether the service provider 201 will accept risk associated with the payment, an indication as to whether the service provider 201 has obtained funds from the payor, an indication as to; whether the service provider 201 has guaranteed funds availability from the payor, and, if the payment will be by check or draft, a number of the check or draft to be issued.

The service provider processor 303 causes, at step 832, a service provider communication interface 315 to transmit the constructed early payment information file to the payee via the network 206 in accordance with a time determined by parameters associated with the early payment information file. A timing parameter may dictate that a constructed early payment information file be transmitted to the payee upon completion of the payment processing, upon completion of a debit of a deposit account associated with the payor, upon determining that payor funds are available, upon issuance of a paper payment to the payee, or even at another time.

At step 835 the service provider processor 303 causes a credit to be issued to the payee. At step 838 the service provider processor 303 causes remittance advice to be issued to the payee. This remittance advice can include any information typically included in remittance information, including any information included in the previously transmitted early posting file. As discussed above, payment, as desired, may be made utilizing any payment mechanism.

Though not depicted in the Figures, in any alternative, a payee that receives an early payment information file preferably transmits a confirmation of receipt of the early payment information file back to the service provider 201 via the network 206. Also preferably, the service provider 201 presents the confirmation to the payor. A confirmation could be, as desired, pushed to a payee, or pulled by a payee from the service provider 201.

Also not depicted in the Figures, if any payment request is cancelled or modified subsequent to transmission of an early payment information file and prior to issuance of a payment, the service provider 201 transmits a notice of the cancellation or modification to the payee. A payment could be cancelled by the service provider 201 due to, for example, a failure of risk processing, failure to obtain funds from a payor, or failure to guarantee funds availability. A payment could also be cancelled by the payor. Also, a payment could be modified by the payor, such as the payor changing a payment amount or a payment date. And, a payment could be modified by the service provider 201, such as, for example, by the service provider 201 changing a payment issue date, or by changing any information included in a previously transmitted early posting file.

Improved Information Flow to Payee
First-Time NSF Returns Reporting

Also in this aspect of the present invention the service provider 201 transmits information to a managed payee 210A-210N related to early payment information. As will be understood from the discussion herein, for a payment made from service provider funds, the service provider 201 debits the subscriber's demand deposit account in at least the amount of the payment. In those situations in which the financial institution at which the subscriber's demand deposit account is maintained declines the debit due to non-sufficient funds (NSF), the service provider 201 transmits a NSF notification to the paid managed payee 210A-210N.

A NSF notification includes at least information identifying a payor (one of subscribers 203A-203N) and information identifying the payment. The information identifying the payment can, as desired, include one or more of a payment identifier, a payment amount, a payment date, and a payment mechanism. Upon the service provider 201 receiving a notice of a debit being declined by a financial institution, a service provider processor 303 retrieves information associated with the payment from the payment history database 310A, generates a NSF notification based upon, at least in part, information stored in the payment history database 310A, and causes a communication interface 315 to transmit the generated NSF notification to the payee via the network 206. Also, the service provider 201 issues a second debit to the subscriber's demand deposit account. If the subscriber's financial institution also declines the second debit, the service provider 201 attempts to collect funds in another manner, not the managed payee 210A-210N.

A managed payee 210A-210N receiving a NSF notification can utilize the information in maintaining accurate records of customer payment habits, along with other beneficial purposes. For example, if the service provider 201 has pulled back funds from the payee, the NSF notification informs the payee the reason funds were pulled back.

Multi-Option Payment Interface

In this aspect of the present invention, a subscriber 203A-203N is presented with choices as to how the service provider 201 will complete payment on behalf of the subscriber 203A-203N through an improved payment user interface. Through a first user interface screen a subscriber 203A-203N identifies a payee, any payor account number with the payee, which may be explicit or implicit from identifying the payee, and a payment amount. Then, through a second user interface screen, the subscriber 203A-203N selects an available payment option, including at one of the three options of Immediate Payment and Posting (IPP), Earliest Available Payment (EAP), and future-dated payment, More particularly, once a service provider processor 303 receives a subscriber request to add a new payment request the processor 303 causes a communication interface 315 to transmit the first screen to the subscriber 203A-203N via the network 206. The subscriber completes the first screen and transmits the added payment information back to the service provider 201 via the network 206.

The added payment information is received by a communication interface 315 and is passed on to a service provider processor 303. The processor 303 then determines if the identified payee is a managed payee or not, and if so, if the managed payee is an electronic managed payee.

The IPP option is only available for electronic managed payees. For all payees the EAP and future-dated options are available. The processor 303 performs the Automatically Adjusted Lead Times processing, described above, to estimate an earliest time to completion of a payment to the identified payee. As desired, this can include performing additional processing, such as risk processing, and/or account scheming, to determine if payment will be issued electronically, or by, paper, to provide the most accurate alternatives. The processor 303 generates the second user interface based upon the identity of the payee and the results of the Automatically Adjusted Lead Times processing and causes a communication interface 315 to transmit the generated second user interface to the subscriber 203A-203N via the network 206.

If the payee is not an electronic managed payee the second user interface will include the future-dated option and the EAP option along with information identifying the estimated time to completion of payment. If the payee is an electronic managed payee, the second user interface will also include the IPP option, It should be noted that beneficially the IPP option could, as desired, be included as a valued-added option. Thus, the subscriber 203A-203N, in such instances, would have to pay a premium to utilize the IPP option.

The subscriber 203A-203N selects a presented option and transmits the selection to the service provider 201 via the network 206. A communication interface 315 receives the selection and passes it on to a service provider processor 303. The processor 303 determines if the future-dated option has been selected. If so, the processor 303 generates a date inquiry and causes a communication interface 315 to transmit the generated date inquiry to the subscriber 203A-203N via the network 206. The date inquiry merely requests from the subscriber 203A-203N a payment date, which is interpreted by the service provider 201 as a process date or a due date, dependent upon an operating context. The subscriber transmits a future payment date to the service provider 201 via the network 206. A communication interface 315 receives the future payment date and passes this information on to a service provider processor 303. The processor 303 then stores the future payment date, along with the other additional payment information, in the data repository 310 for later processing. Alternatively, as desired, the date inquiry could be included in the second screen, eliminating the need for further interaction between the service provider 201 and the subscriber.

If a subscriber 203A-203N selects a presented IPP option the processor 303 invokes the Improved Information Flow To Payee—Early Payment Information processing described above to inform the payee that the subscriber 203A-203N has initiated a payment and to complete the added payment. If a subscriber 203A-203N selects the, presented EAP option the processor 303 completes the added payment without informing the payee that the subscriber 203A-203N has initiated a payment. The service provider 201 initiates further processing at the next processing cycle to complete the payment.

It will be apparent that the various aspects of the present invention described herein each work to ensure that payments are timely made to payees and that information associated with payments is timely distributed to both payors and payees while providing the payor maximum flexibility with regards to the scheduling of payments. The various aspects can, as desired; be utilized independently or in different combinations. As an example of one possible combination use of different aspects of the present invention, the service provider 201 could first determine that a payment to an electronic managed payee 210A-210N from a subscriber 203A-203N is due without receiving a payment request from the subscriber 203A-203N, based upon the Proactive Payment Due Notification processing. After receiving a notice of a due payment, a subscriber 203A-203N requests to add a payment, at which point the service provider 201 presents the Multi-Option Payment Interface to the subscriber 203A-203N, including the EAP option with a lead time based upon the Automatically Adjusted Lead Times processing, the IPP option, and the futures-dated option. The subscriber 203A-203N selects an option and payment is completed in accordance with the selected option. If the subscriber 203A-203N has selected the IPP option the service provider 201 performs the Improved Information Flow to Payee—Early Payment Information processing. After the managed payee 210A-210N receives payment from the service provider 201 the managed payee 210A-210N provides back to the service provider 201 posting information, which is in turn provided to the subscriber 203A-203N by the service provider 201 in accordance with the Delivery of Payment Posting Information to Subscribers processing. Of course, other combinations of the various aspects, as well as other orderings of the aspects included in the above example, are certainly within the scope of the present invention and are not excluded.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method, comprising:
   identifying, by a computerized payment service provider system comprising one or more computers, a payor and a payee of the payor;
   retrieving, by the computerized payment service provider system, a payment history comprising information indicative of a plurality of payments made to the payee on behalf of the payor, wherein each of the plurality of payments is associated with a respective payment date;
   determining, by the computerized payment service provider system based at least in part upon evaluating the payment history a payment frequency pattern, wherein determining the payment frequency pattern comprises determining a respective time interval for each of one or more combinations of successive payments of the plurality of payments, wherein each respective time interval is determined based at least in part on the respective payment dates associated with the respective combination of successive payments;
   generating a statistical quantity, by the computerized payment service provider system, by performing a statistical function based at least in part on one or more of the respective payment dates;
   calculating, by the computerized payment service provider system based at least in part on and the determined payment frequency pattern and the statistical quantity, a next expected payment date;
   generating, by the computerized payment service provider system, a payment due notification comprising an identity of the payee and an indication of the next expected payment date; and
   transmitting, by the computerized payment service provider system, the payment due notification to a device operable by the payor.

2. The method of claim 1, further comprising:
   identifying, by the computerized payment service provider system, at least one notification control parameter associated with communicating the payment due notification to the payor.

3. The method of claim 2, wherein identifying the at least one notification control parameter comprises identifying at least one of (i) a parameter applicable to the combination of the payor and the payee, (ii) a parameter applicable to a plurality of payees for the payor, wherein the plurality of payees includes the payee, (iii) a parameter applicable to a sponsor of the payor, or (iv) a parameter applicable to the payment service provider system.

4. The method of claim 3, wherein identifying the at least one notification control parameter comprises identifying a plurality of instances of a notification control parameter, the method further comprising:
   determining, by the computerized payment service provider system, a precedence ordering for the plurality of instances of the notification control parameter.

5. The method of claim 2, wherein identifying at least one notification control parameter comprises identifying at least one of (i) a parameter associated with a number of times to notify the payor of the next expected payment date, (ii) a parameter associated with a time interval between transmitting the payment due notification and an additional payment due notification, (iii) a parameter associated with a period of time in advance of the next expected payment date in which to issue the payment due notification, or (iv) a parameter indicative of whether the payment due notification is to be transmitted via email or based upon the payor accessing a payment application.

6. The method of claim 2, further comprising:
   receiving, by the computerized payment service provider system on behalf of the payor, information associated with establishing at least one of the at least one notification control parameter; and
   establishing, by the computerized payment service provider system based at least in part upon the received information, the at least one of the at least one notification control parameter.

7. The method of claim 1, wherein generating a payment due notification comprises generating a payment due notification comprising a link to a payment interface that facilitates the receipt of a payment request.

8. The method of claim 7, further comprising:
   receiving, by the computerized payment service provider system based at least in part upon a payor selection of the link, a request for the payment interface;
   generating, by the computerized payment service provider system in response to the received request, a payment request form; and
   transmitting, by the computerized payment service provider system to the payor, the generated payment request form.

9. The method of claim 8, wherein generating a payment request form comprises generating a payment request form pre-populated with at least one of (i) information associated with the payee, (ii) the next expected payment date, or (iii) an estimated payment amount.

10. The method of claim 1, further comprising:
    identifying, by the computerized payment service provider, a payment history control parameter associated with a period of the payment history to be evaluated,
    wherein the payment history is identified based at least in part on the payment history control parameter.

11. The method of claim 1, wherein the statistical quantity is an average of the one or more respective payment dates.

12. The method of claim 1, wherein each of the plurality of payments is further associated with a respective payment amount, the method further comprising:
    determining, by the computerized payment service provider system based at least in part on the payment history, an estimated payment amount, wherein generating a payment due notification comprises generating a payment due notification comprising the estimated payment amount.

13. The method of claim 1, further comprising:
identifying, by the computerized payment service provider system, one or more pending payment requests associated with the payor; and
determining, by the computerized payment service provider system, that none of the one or more pending payment requests are associated with the payee.

14. The method of claim 1, wherein transmitting the payment due notification comprises at least one of (i) transmitting the payment due notification via email or (ii) transmitting the payment due notification during a communications session established by the payor accessing a payment application hosted by the payment service provider system.

15. The method of claim 1, further comprising:
storing, by the computerized payment service provider system, information associated with the payment due notification.

16. The method of claim 1, wherein executing the statistical function to generate the statistical quantity comprise associating one or more values with the one or more respective payment dates and determining the statistical quantity based at least in part on the one or more values.

17. A system, comprising:
at least one processor; and
at least one memory device storing computer-executable instructions that, when executed by the at least one processor, cause the at least one processor to perform operations comprising:
identifying a payor and a payee of the payor;
retrieving a payment history comprising information indicative of a plurality of payments made to the payee on behalf of the payor, wherein each of the plurality of payments is associated with a respective payment date;
determining, based at least in part upon evaluating the payment history a payment frequency pattern, wherein determining the payment frequency pattern comprises determining a respective time interval for each of one or more combinations of successive payments of the plurality of payments, wherein each respective time interval is determined based at least in part on the respective payment dates associated with the respective combination of successive payments;
generating a statistical quantity by performing a statistical function based at least in part on one or more of the respective payment dates;
calculating, based at least in part on and the determined payment frequency pattern and the statistical quantity, a next expected payment date;
generating a payment due notification comprising an identity of the payee and an indication of the next expected payment date; and
transmitting the payment due notification to a device operable by the payor.

18. The system of claim 17, wherein the at least one processor is further configured to execute the computer-executable instructions to the operations further comprising:
identify at least one notification control parameter associated with communicating the payment due notification to the payor.

19. The system of claim 18, wherein the at least one notification control parameter comprises at least one of (i) a parameter associated with a number of times to notify the payor of the next expected payment date, (ii) a parameter associated with a time interval between the payment due notification and an additional payment due notification, (iii) a parameter associated with a period of time in advance of the next expected payment date in which to issue the payment due notification, or (iv) a parameter indicative of whether the notification will be transmitted via email or based upon the payor accessing a payment application.

20. The system of claim 18, wherein the at least one notification control parameter comprises at least one of (i) a parameter applicable to the combination of the payor and the payee, (ii) a parameter applicable to a plurality of payees for the payor, wherein the plurality of payees includes the payee, (iii) a parameter applicable to a sponsor of the payor, or (iv) a parameter applicable to the payment service provider system.

21. The system of claim 17, wherein each of the plurality of payments is associated with a respective payment amount, and wherein the at least one processor is further configured to execute the computer-executable instructions to:
determining, based at least in part on the payment history, an estimated payment amount,
wherein the generated payment due notification comprises the estimated payment amount.

22. The system of claim 17, wherein the payment due notification is transmitted to the payor by at least one of (i) an email or (ii) a presentation communicated to the payor based upon the payor accessing a payment application.

* * * * *